(12) United States Patent
Leininger et al.

(10) Patent No.: US 7,325,364 B2
(45) Date of Patent: Feb. 5, 2008

(54) OUTDOOR BLIND

(75) Inventors: James R. Leininger, San Antonio, TX (US); Peter A. Leininger, San Antonio, TX (US); Richard Welch, Fredericksburg, TX (US); Joseph Paul Lee, Freer, TX (US)

(73) Assignee: Macho Bucks, Inc., San Antonio, TX (US)

( * ) Notice: Subject to any disclaimer, the term of this patent is extended or adjusted under 35 U.S.C. 154(b) by 631 days.

(21) Appl. No.: 10/870,657

(22) Filed: Jun. 16, 2004

(65) Prior Publication Data

US 2005/0279394 A1   Dec. 22, 2005

(51) Int. Cl.
*E04H 9/00*   (2006.01)
*E04B 7/00*   (2006.01)
*A01M 31/00*   (2006.01)

(52) U.S. Cl. .................... 52/169.6; 52/79.1; 52/171.1; 43/1

(58) Field of Classification Search ............... 52/79.1, 52/66, 171.1, 201, 169.6; 43/1; 135/901
See application file for complete search history.

(56) References Cited

U.S. PATENT DOCUMENTS

| 3,513,605 | A | * | 5/1970 | Smith | |
|---|---|---|---|---|---|
| 3,690,334 | A | * | 9/1972 | Boyd | 135/123 |
| 3,886,678 | A | * | 6/1975 | Caccamo | 43/1 |
| 4,110,941 | A | * | 9/1978 | Scott | 52/66 |
| 4,719,716 | A | * | 1/1988 | Chrisley, Jr. | 52/263 |
| 4,738,045 | A | | 4/1988 | Cardozo | |
| 4,876,817 | A | | 10/1989 | Hill | |
| 5,479,738 | A | | 1/1996 | Danna | |
| 5,647,159 | A | | 7/1997 | Latschaw | |
| 5,822,906 | A | | 10/1998 | Ward | |
| 5,930,961 | A | * | 8/1999 | Beaudet | 52/79.4 |
| 5,983,913 | A | * | 11/1999 | Fargason | 52/79.1 |
| 6,553,725 | B2 | * | 4/2003 | Washington | 52/64 |
| 2002/0074030 | A1 | * | 6/2002 | Raines et al. | 43/1 |
| 2003/0172574 | A1 | * | 9/2003 | Drummond | 43/1 |

\* cited by examiner

*Primary Examiner*—Jeanette Chapman
*Assistant Examiner*—Elizabeth A Plummer
(74) *Attorney, Agent, or Firm*—Charles W. Hanor, PC

(57) ABSTRACT

An upright hunting blind that is positioned partially underground and has viewing means mounted on its walls such that the viewing means are adjacent or near the ground level when the blind is positioned partially underground. Viewing means provide an opening for viewing and for extending an arrow, a gun barrel, or a camera through said opening while concealing the arrow, gun barrel, or camera. An upright blind having a height sufficient for more than one average hunter to stand upright in the blind, and a width sufficient for more than one average hunter to sit comfortably in the blind and move between the viewing means.

12 Claims, 18 Drawing Sheets

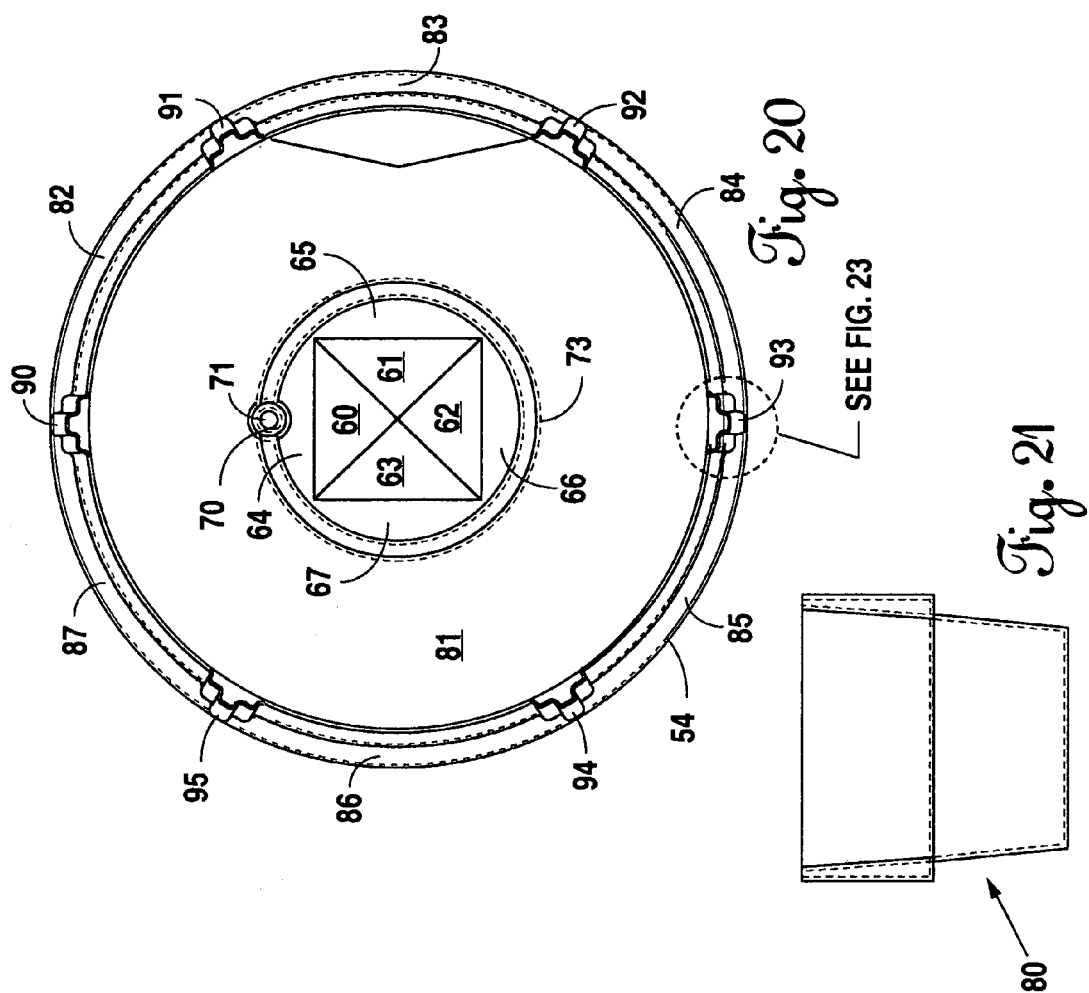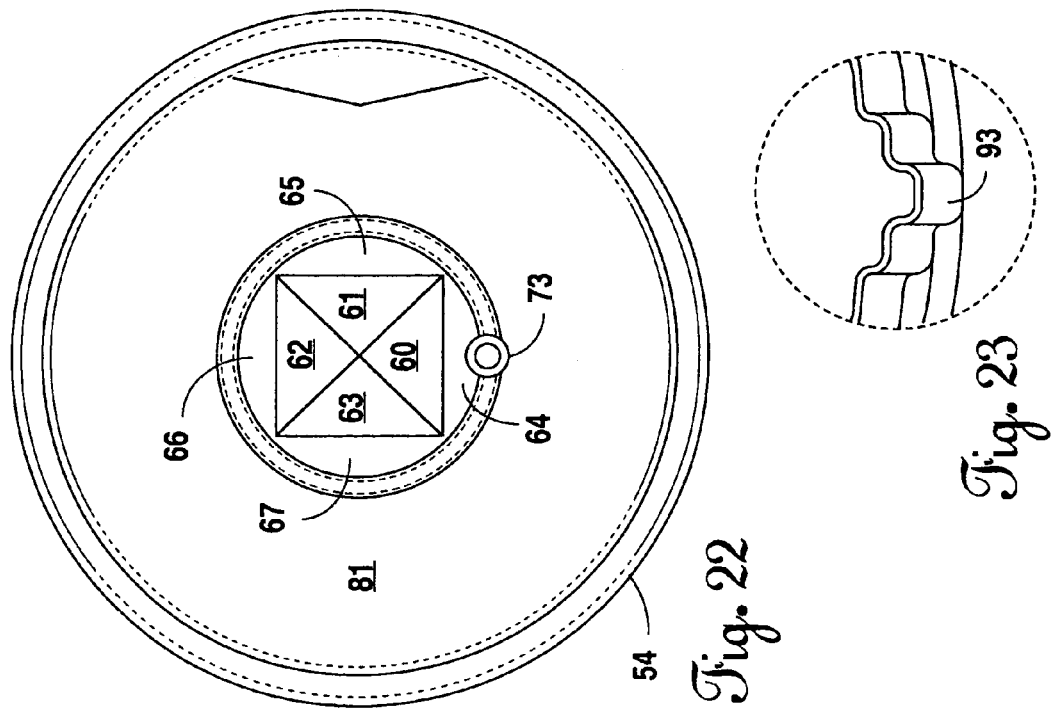

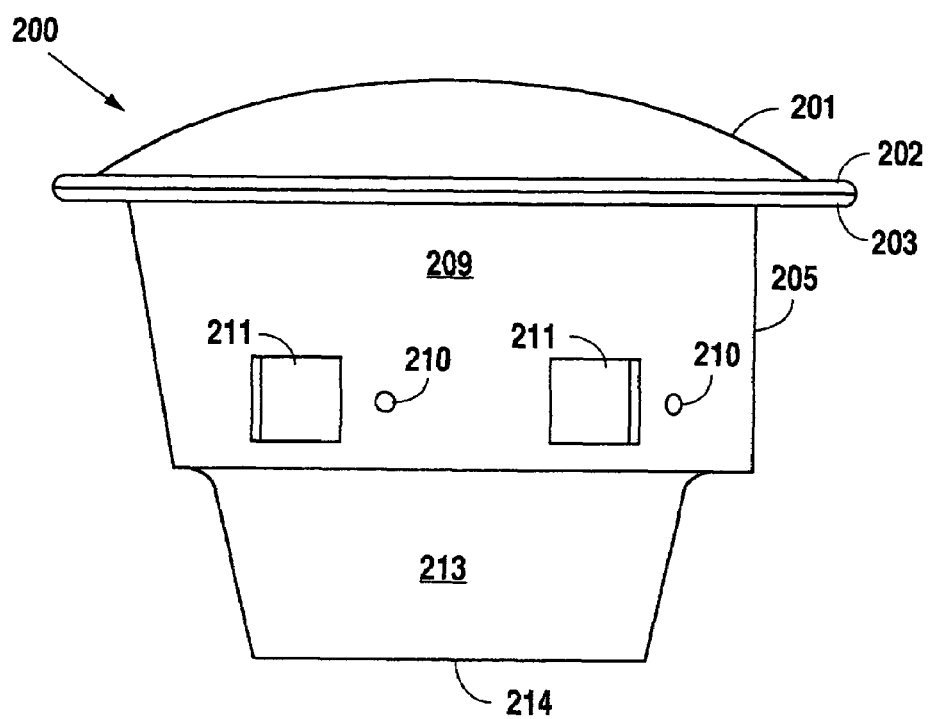
Fig. 33
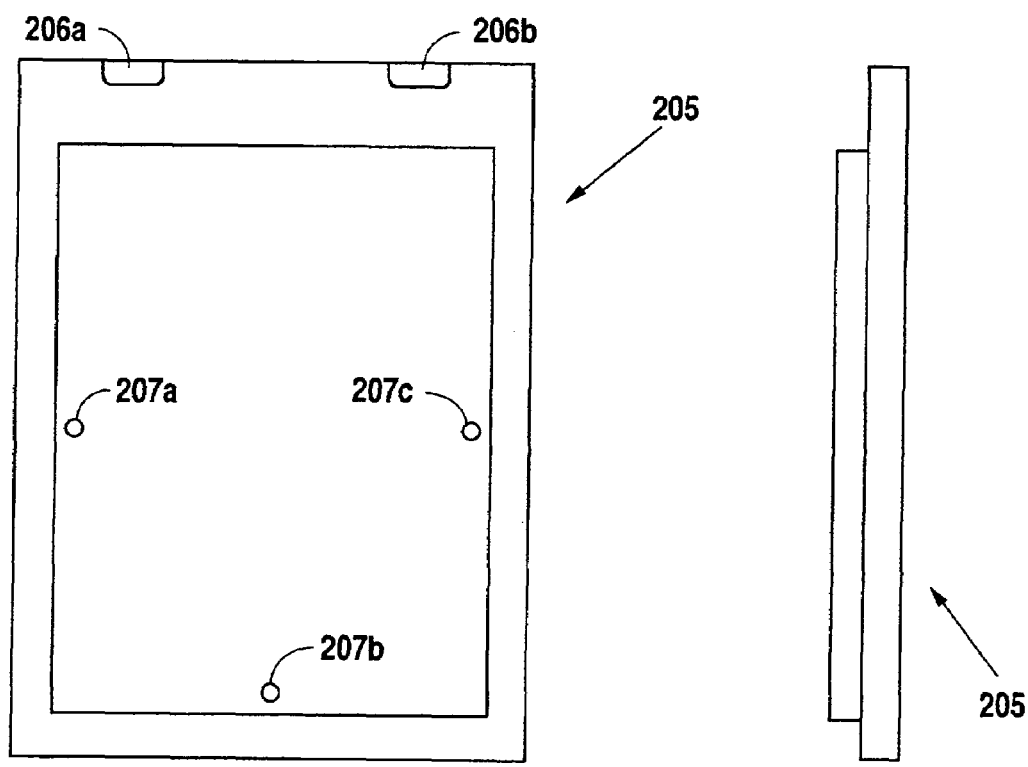
Fig. 34
Fig. 36

OUTDOOR BLIND

BACKGROUND OF THE INVENTION

The present invention relates to a blind used for interacting with wildlife, including hunting and observing waterfowl. In particular the present invention relates to a blind that is positioned partially underground allowing a hunter to view game unnoticed and to stand up without opening the blind.

Interacting with nature, especially through hunting, bird watching, and photography, is a popular activity. Blinds are often utilized to conceal individuals, dogs, and equipment in the wild, which enables an individual to interact with nature by allowing wildlife to approach the blind while behaving normally in their natural environment. Hunting, photographing, and generally observing wildlife in their natural environment is preferable. Blinds are positioned in the natural habitat of wildlife in order to conceal the individuals from the wildlife, and to prevent the wildlife from being frightened away from an area of their habitat by the presence of the individuals.

Various types of blinds are known in the prior art ranging from inexpensive, makeshift blinds constructed from the foliage available in the habitat area, to more expensive structures such as transportable blinds that are transported to the wildlife habitat area or permanent structures specifically designed and constructed to accommodate and conceal one or more individuals in the wildlife habitat area. Examples of prior art transportable blinds are disclosed in the U.S. Pat. Nos. of Chrisley, Jr. No. 4,719,716 and Horsmann No. 4,794,717 and an example of a permanent blind structure is disclosed in the U.S. Pat. of Cardozo No. 4,738,045. Blinds of various designs are well known in the art, including pit blinds and surface blinds, permanent blinds, and portable blinds. For example, U.S. Pat. No. 5,479,738 to Danna describes a pit blind, built to be occupied by multiple individuals, and is designed to be partially buried in the ground. A unit of the type described by Danna is best suited for use on the perimeter of a landing field for waterfowl. U.S. Pat. No. 4,751,936 to Zibble et al. describes a surface blind that rests on the ground surface, covering and concealing an individual utilizing a foldable frame with a hinged top segment. The hinged top segment permits an individual to rapidly transition from a prone position to a sitting position in order to shoot nearby waterfowl.

An outdoor blind to be useful must allow users to rapidly gain egress for shooting of game. The timing and manner of this egress are especially important in waterfowl blinds because the birds fly quite fast and often are near maximum shooting range when blind egress is instituted. It is also essential that upon opening the blind for shooting or viewing that nothing blocks either the gun or camera egress or a shooter's posturing.

To be practical for a hunter, an outdoor blind must allow the hunter to view the area about the blind while enabling him/her to maintain a reasonably comfortable concealed position at the same time. Outdoor blinds have been made from wooden barrels, steel drums, or concrete tanks. They may be confining and uncomfortable, and it is generally impossible for a hunter in an outdoor blind to scan the entire horizon while seated or to move into proper position for taking shots in any direction.

The present invention has been conceived on the principle that the shape of the blind as well as the location of various features is ideally suited for the hunter's convenience. The disclosed invention is made of water impervious material having upper and lower sections. The present invention offers maximum concealment for the user, ample space for viewing or shooting in any direction, ample foot space to prevent cluttered footing upon viewing or shooting in any direction, as well as viewing means or ports which are as small as possible. Moreover, the blind construction may be made of material that ensures long service with minimum maintenance. The shape of the blind provides adequate legroom when seated to accommodate both large and small individuals.

It is accordingly a primary object of the present invention to provide a blind for interacting with wildlife that has the ability to conceal the user from the wildlife while limiting surface exposure of the blind above ground.

Another object of the present invention is to provide a blind that has several viewing means which provide maximum peripheral vision for the user.

A further object is to provide a blind that is both easily transportable and easy to install.

A still further object is to provide a blind that allows for comfortable concealment of both the individual and the equipment while a user is sitting down or standing up.

Another object is to provide protection from weather.

Other objects of the invention will become apparent from the following detailed disclosure.

BRIEF SUMMARY OF THE INVENTION

The invention comprises an upright outdoor blind made of water impervious material such that the lower section thereof may be positioned underground. Viewing means are mounted on the walls of the upright blind so that the viewing means are adjacent to the ground or near the ground level when the lower section is positioned underground. The viewing means provide openings for viewing and for extending an arrow, gun barrel or camera through said openings which keep the arrow, gun barrel, or camera concealed.

The viewing means may have extensions which extend outwardly from openings in the walls of the blind to conceal a person and the arrow, gun barrel, or camera that he/she is extending through said opening. The outdoor blind may also have viewing means with extensions extending inwardly from openings in the walls of the blind in order to conceal a person and the arrow, gun barrel, or camera that he/she is extending through said opening. These outwardly and inwardly extensions have cross sectional areas which increase in order to provide the user with peripheral viewing and shooting.

Positioning the viewing means near ground level facilitates concealment and hiding of persons in the blind because many animals can see at least partially over the blind. By positioning the viewing means near ground level an animal is also less likely to detect a person in the blind who is observing the animal.

The upright blind has a height sufficient for an average hunter to stand upright in the blind and a width sufficient for an average hunter to sit comfortably in the blind and to move between the viewing means. The outdoor blind may be formed of upper and lower sections that are connected together to form the upright blind.

BRIEF DESCRIPTION OF THE SEVERAL VIEWS OF THE DRAWINGS

FIG. 20 is a bottom plain view of the bottom section of the outdoor blind of FIG. 18;

FIG. 21 is a side elevation view of the lower portion of the bottom section of the outdoor blind of FIG. 18;

FIG. 22 is a top plain view of the bottom section of the outdoor blind of FIG. 18;

FIG. 23 is a cross section view of the support beam of the outdoor blind of FIG. 18;

FIG. 33 is a side elevation view of the outdoor blind of FIG. 31.

FIG. 34 is an internal front elevation view of the entry door for the outdoor blind of FIG. 31.

FIG. 36 is a side elevation view of the entry door for the outdoor blind of FIG. 31.

DETAILED DESCRIPTION OF THE INVENTION

Figure 1:
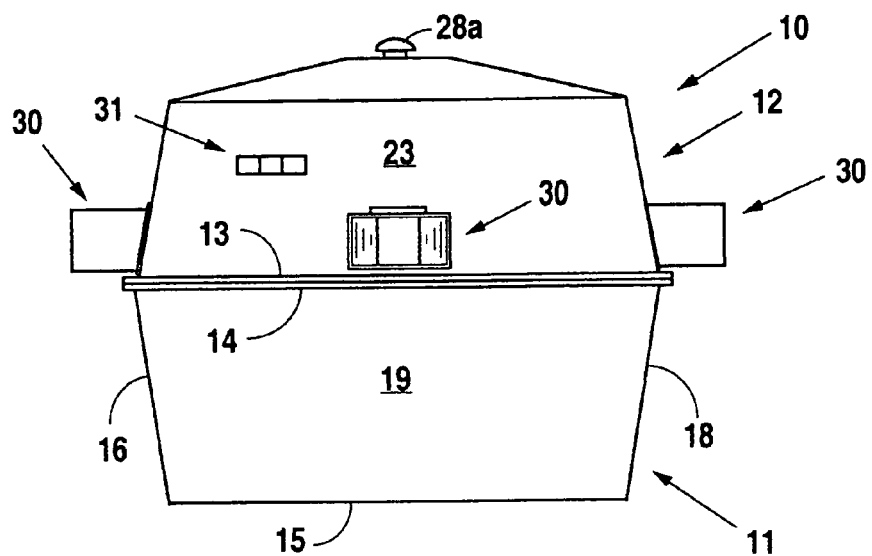
FIG. 1 is a side elevation view of the outdoor blind.

Referring to FIG. 1, there is shown an upright outdoor blind or hunting blind 10. The outdoor blind 10 may comprise a lower section 11 and an upper section 12. The bottom peripheral edge of the flat flange 13 on the upper section 12 is designed to sit on the top peripheral edge of the flat flange 14 on the lower section 11 of the outdoor blind 10. A waterproof sealant is placed between the mating flanges of the upper section 12 and the lower section 11 of the outdoor blind 10 such that when the two sections are joined together they form a single water tight unit. It is understood that the blind 10 could be built as a single unit, rather than two sections, depending on the materials and type of construction used.

Figure 5:
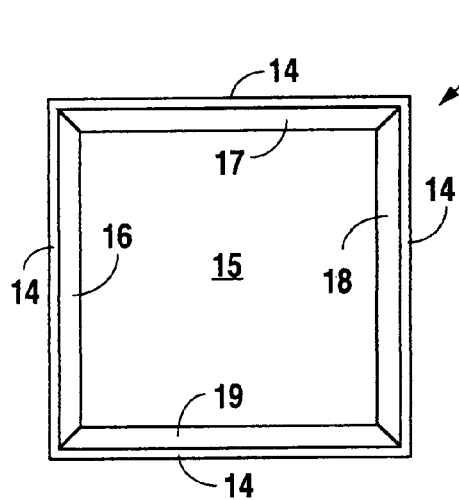
FIG. 5 is a top plain view of the bottom section of the outdoor blind.
Figure 4:
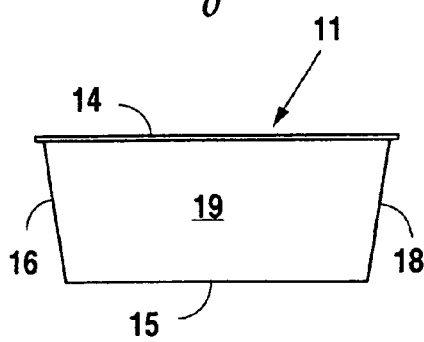
FIG. 4 is a side elevation view of the bottom section of the outdoor blind.

Referring to FIGS. 4 and 5, the lower section 11 includes a bottom wall 15 and sidewalls 16, 17, 18, and 19. The edges of the bottom wall 15 are connected to the bottom edges of the lower section sidewalls 16, 17, 18, and 19. The lower section sidewalls 16, 17, 18, and 19 extend outwardly at an angle as seen in FIG. 4. The top edges of the lower section sidewalls 16, 17, 18, and 19 are connected to the flange 14.

Figure 3:
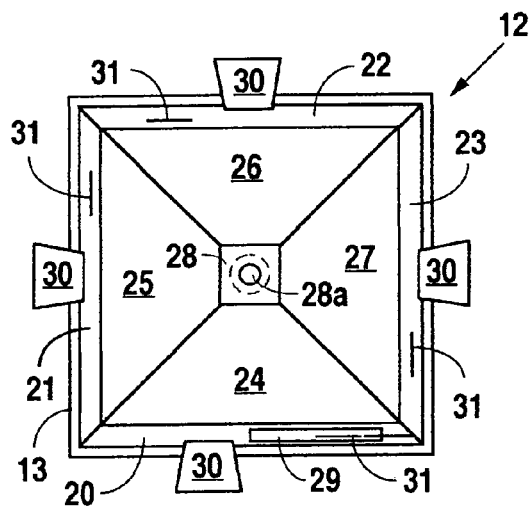
FIG. 3 is a top plain view of the outdoor blind.
Figure 2:
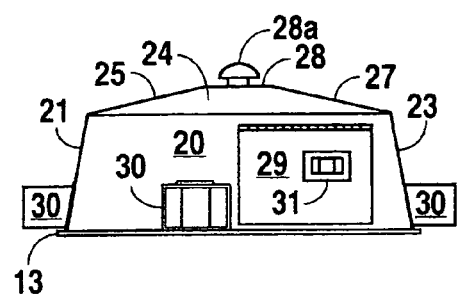
FIG. 2 is a side elevation view of the top section of the outdoor blind.
Figure 16:
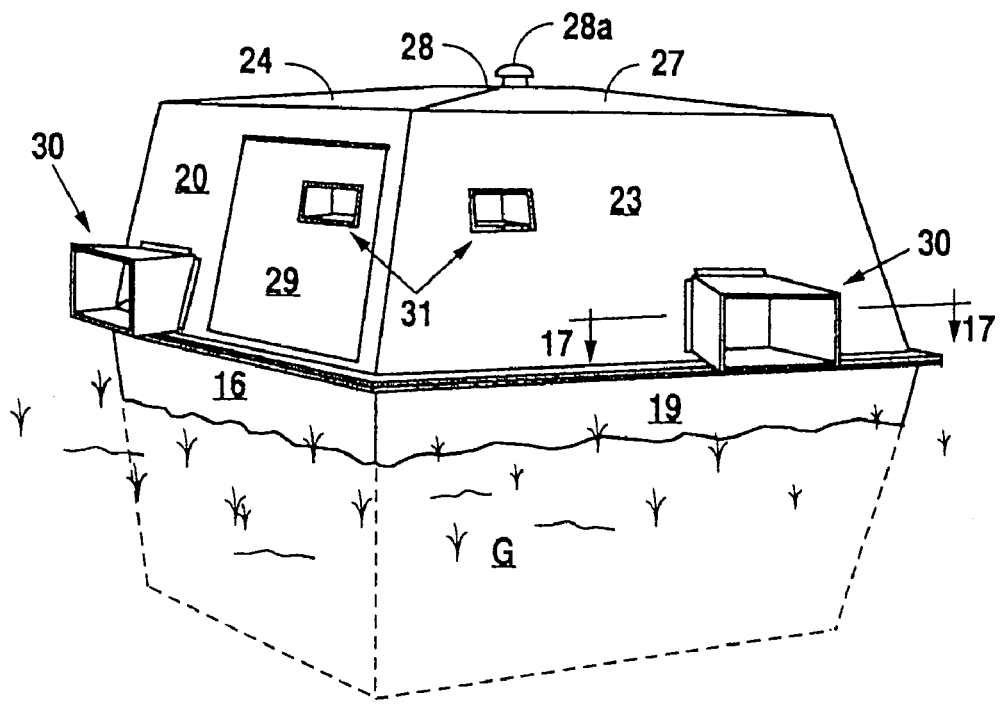
FIG. 16 is a perspective view of the blind positioned in the ground.

Referring to FIG. 3, the upper section 12 includes sidewalls 20, 21, 22, and 23 whose bottom edges are connected to the flange 13. The top edges of the upper section sidewalls 20, 21, 22, and 23 are connected to the bottom edges of roof panels 24, 25, 26, and 27. The roof includes panels 24, 25, 26, 27, 28, and a vent 28a. The edges of roof panel 28 are connected to the top edges of the upper section sidewalls 24, 25, 26 and 27. A vent 28a is mounted to roof panel 28 in order to allow air flow into and out of the blind, creating ventilation. The upper section 12 also includes an entry door 29, as seen in FIGS. 2, 3, and 16. The entry door 29 has hinges on its top edge, and with these hinges the entry door 29 is mounted to the upper section sidewall 20. The entry door can swing open and closed and it includes a conventional latch to secure it in place.

Openings are provided in the upper section sidewalls 20, 21, 22, and 23 for viewing purposes, as seen in FIGS. 1, 2, 3, and 16. The openings may have external and internal attachments. The external attachments 30 and internal attachments 31 are viewing windows that provide the user with a means for viewing and shooting.

Figure 6:
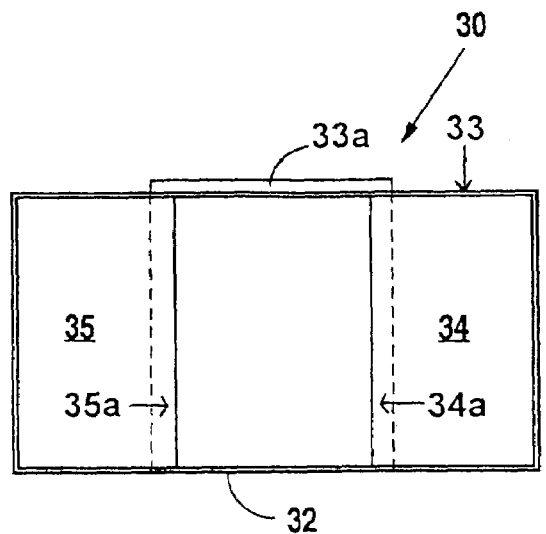
FIG. 6 is a front elevation view of an external attachment for a shooting window as viewed from the outside of the blind.
Figure 8:
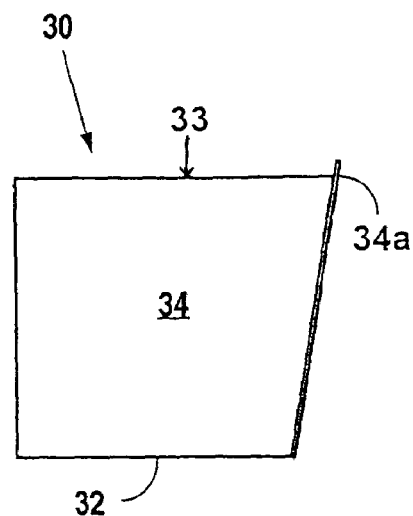
FIG. 8 is a side elevation view of an external attachment for the shooting window.
Figure 7:
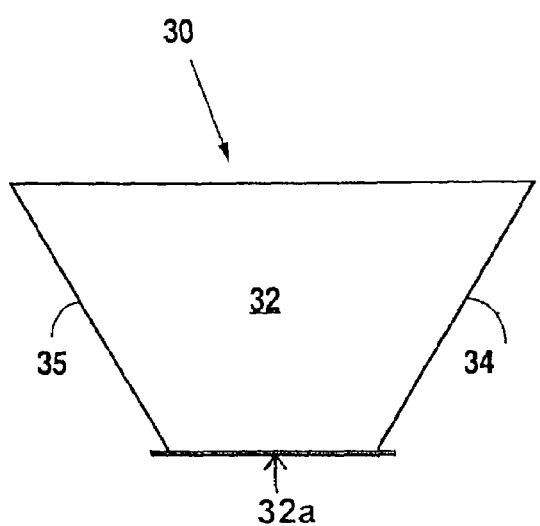
FIG. 7 is a bottom view of an external attachment for the shooting window.

The external attachment 30 for the shooting window is shown in detail in FIGS. 6, 7, and 8. The external attachments 30 extend externally from the blind in order to prevent an animal from viewing a gun barrel, an arrow, or a camera that is positioned outside of the blind walls. The external attachment 30 includes a bottom wall 32, a top wall 33, and sidewalls 34 and 35. As seen in FIGS. 3, 6, and 7, the sidewalls 34 and 35 flare outwardly, and the cross sectional area of the external attachment 30 increases as the distance from the blind increases. The increase in cross sectional area allows peripheral vision for the hunter or observer in the blind. As shown in FIG. 8, the inside edges 34a and 35a, of the sidewalls 34 and 35 are inclined at the same angle as the upper section sidewalls 20, 21, 22, and 23. The edges 32a, 33a, 34a, and 35a, of the walls 32, 33, 34 and 35 of the external attachment 30, form a flange for mounting of the shooting window.

Figure 17:
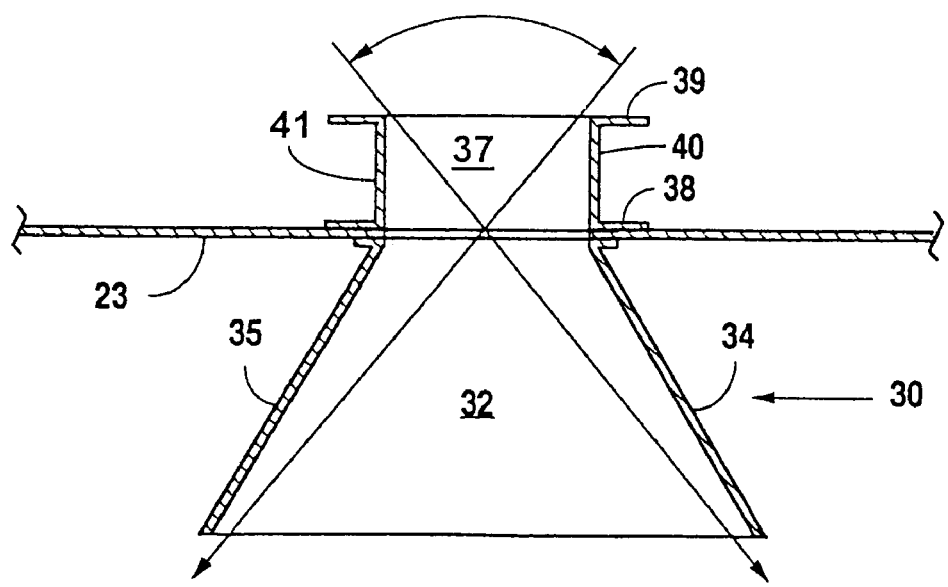
FIG. 17 is a top cross section view of the shooting window showing how an arrow can be positioned for shooting.

The external attachments 30 for the shooting windows also permit the use of a bow and arrow inside the blind as seen in FIG. 17. The blind is sufficient in width, depth, and height to allow for the extension of a bow and arrow.

Figure 9:
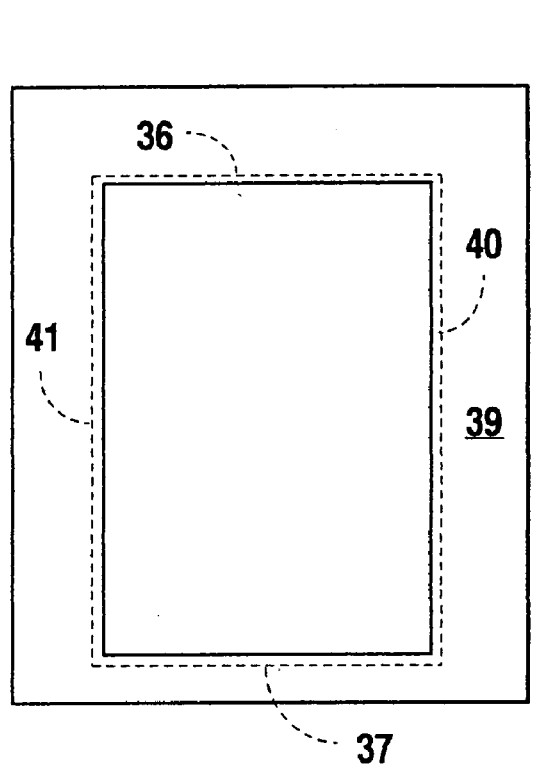
FIG. 9 is a front elevation view of an internal attachment for a shooting window as viewed from the inside of the blind.
Figure 11:
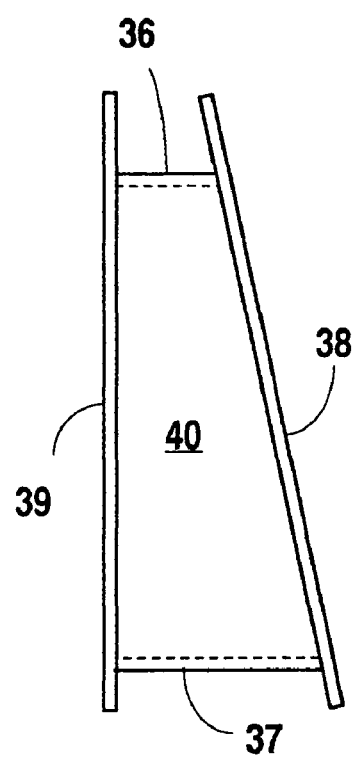
FIG. 11 is a side elevation view of an internal attachment for a shooting window.
Figure 10:
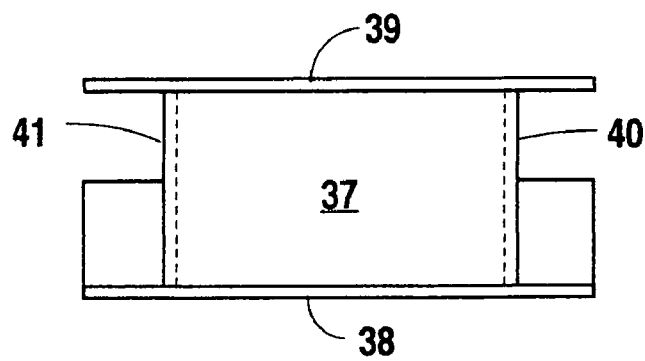
FIG. 10 is a bottom view of an internal attachment for a shooting window.

An internal attachment 31 for the shooting window is shown in FIG. 9. Referring to FIGS. 9, 10, and 11, the internal attachment 31 has a top wall 36, a bottom wall 37, an inclined wall 38, a vertical wall 39, and sidewalls 40 and 41. The inclined wall 38 is at the same angle as the inside of the upper section sidewalls 20, 21, 22, and 23, and the internal attachment 31 can be secured to the openings in these walls using the edges of the inclined wall 38.

Figure 14:
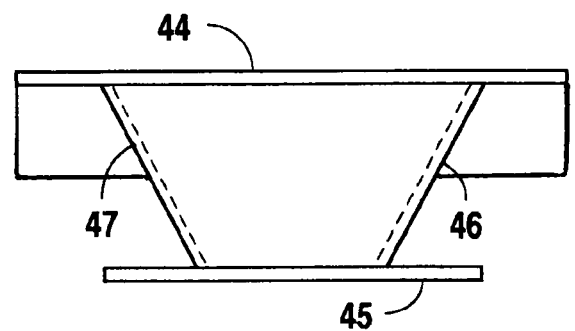
FIG. 14 is a bottom view of an internal attachment for a camera window.
Figure 13:
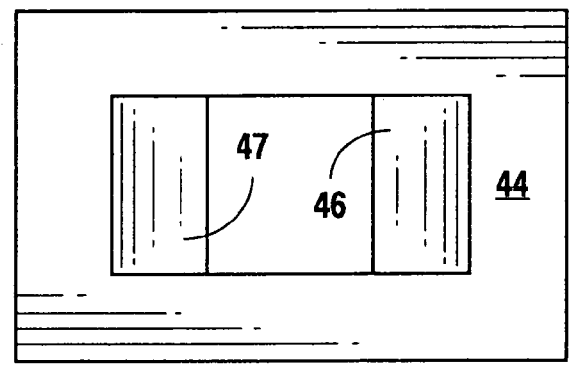
FIG. 13 is a front elevation view of an internal attachment for a camera window as viewed from the outside of the blind.
Figure 15:
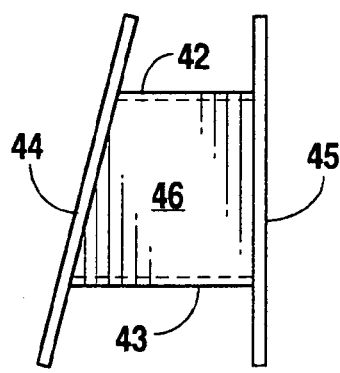
FIG. 15 is a side elevation view of an internal attachment for a camera window.
Figure 12:
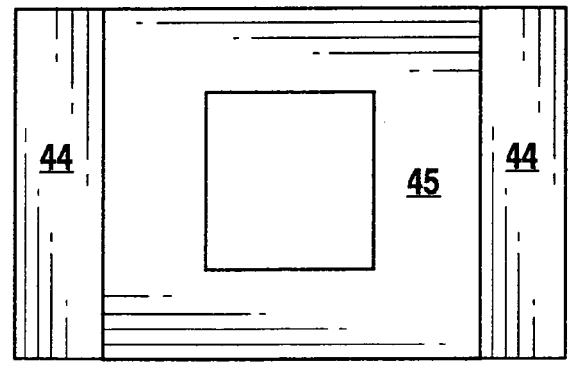
FIG. 12 is a front elevation view of an internal attachment for a camera window as viewed for the inside of the blind.

An internal attachment 31 for the camera window is shown in FIGS. 13 and 16. Referring to FIGS. 12, 13, 14, and 15, the internal attachment has a top wall 42, bottom wall 43, an inclined wall 44, a vertical wall 45, and sidewalls 46 and 47. The inclined wall 44 is at the same angle as the inside of walls 20, 21, 22 and 23, and it can be secured to these walls where there is an opening. As would be apparent, the camera window attachment is mounted on the inside of the upper section sidewalls 20, 21, 22, and 23. As seen in FIGS. 13 and 14, the sidewalls 46 and 47 flare outwardly, and the cross sectional area of the internal attachment 31 increases as it extends between the vertical wall 45 and the inclined wall 44. The increase in cross sectional area allows peripheral vision for the hunter or observer in the blind. The increased cross sectional area also allows for the insertion of a camera lens without discovery of the person or the camera by any wildlife that may be near by. The person taking pictures can still take pictures from side to side without substantially exposing the camera lens to the side of the blind where extension of a camera lens might be observed.

The lower section 11 of the outdoor blind 10 is designed to be installed underground such that the lower section 11 is generally level with the surface of the ground as shown in FIG. 16. When properly positioned in the ground the external attachments 30 for the shooting windows are just above ground level. This positions the hunter at a very low level relative to the game. Positioning the external attachments 30 for the shooting windows near the bottom edge of the upper section 12 facilitates the lack of detection by any wildlife that may be near by. This is true because it is generally possible for game such as deer to look over the top of the blind, rather than into the blind, which allows a hunter to remain undiscovered. Burying the lower section 11 of the blind underground also reduces human scent and noises. This puts the user on a similar level with most animals.

The interior of the outdoor blind 10 is generally spacious and this allows room for more than one user to simultaneously view the windows positioned on all 4 sides of the blind. The offset of the viewing windows from the shooting windows allows a user to access the viewing windows for viewing, photographing, video taping, etc., without blocking the view of a hunter who is using the shooting window. In order to provide convenient viewing for the user while he/she is sitting in a standard chair located inside the blind, all shooting windows are set at a height that is equivalent to the eye level of an average sized person who is sitting in a standard chair while inside the blind. Standing room is also provided for average sized individuals.

The basic shell of the outdoor blind 10 may be constructed of fiberglass or rotational molded plastic resin (also known as roto-molded plastic). However, other material may be used, but the material should be waterproof and rot resistant, preferably.

Figure 18:
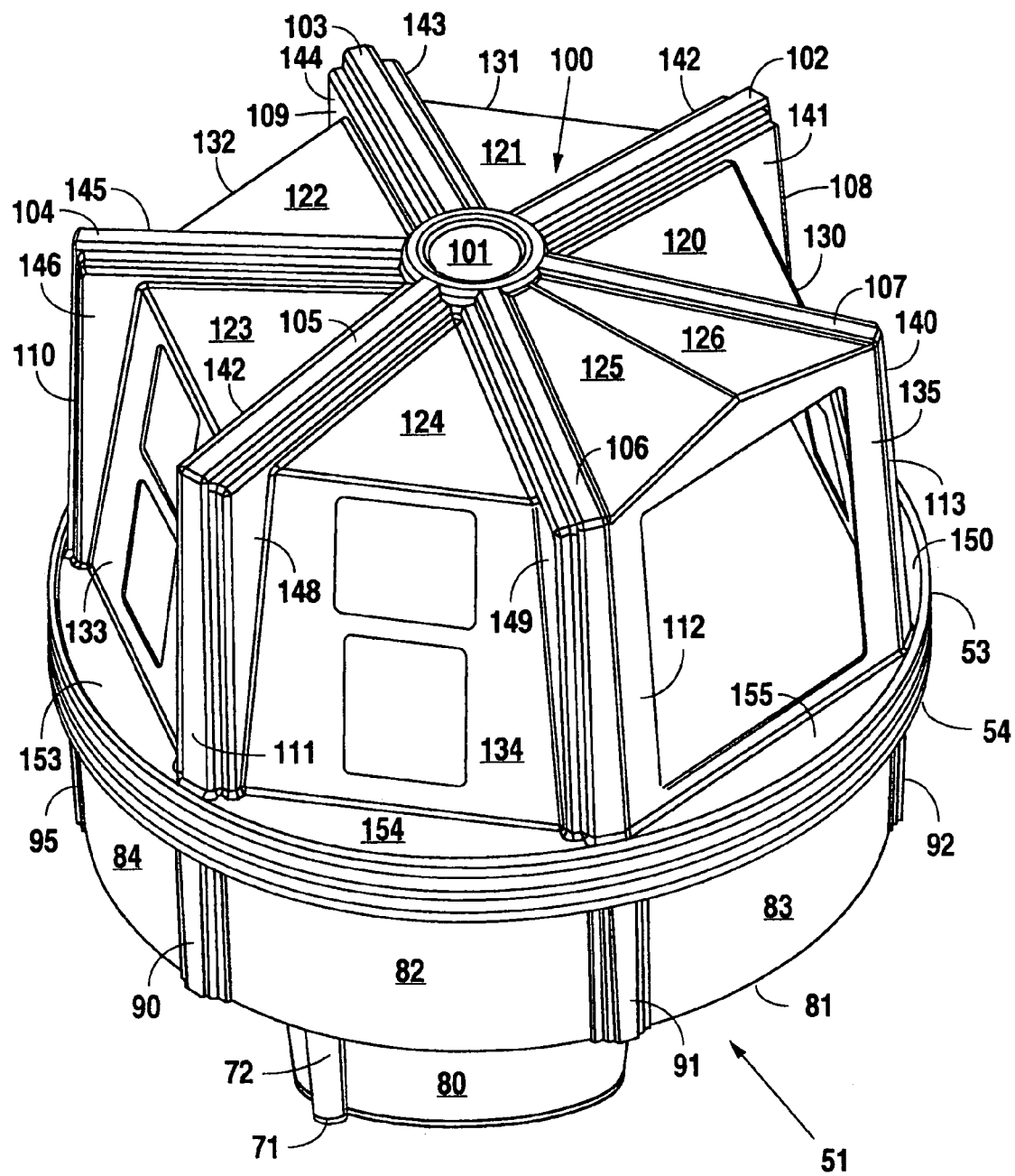
FIG. 18 is a top-down perspective view of a second embodiment of the outdoor blind.
Figure 19:
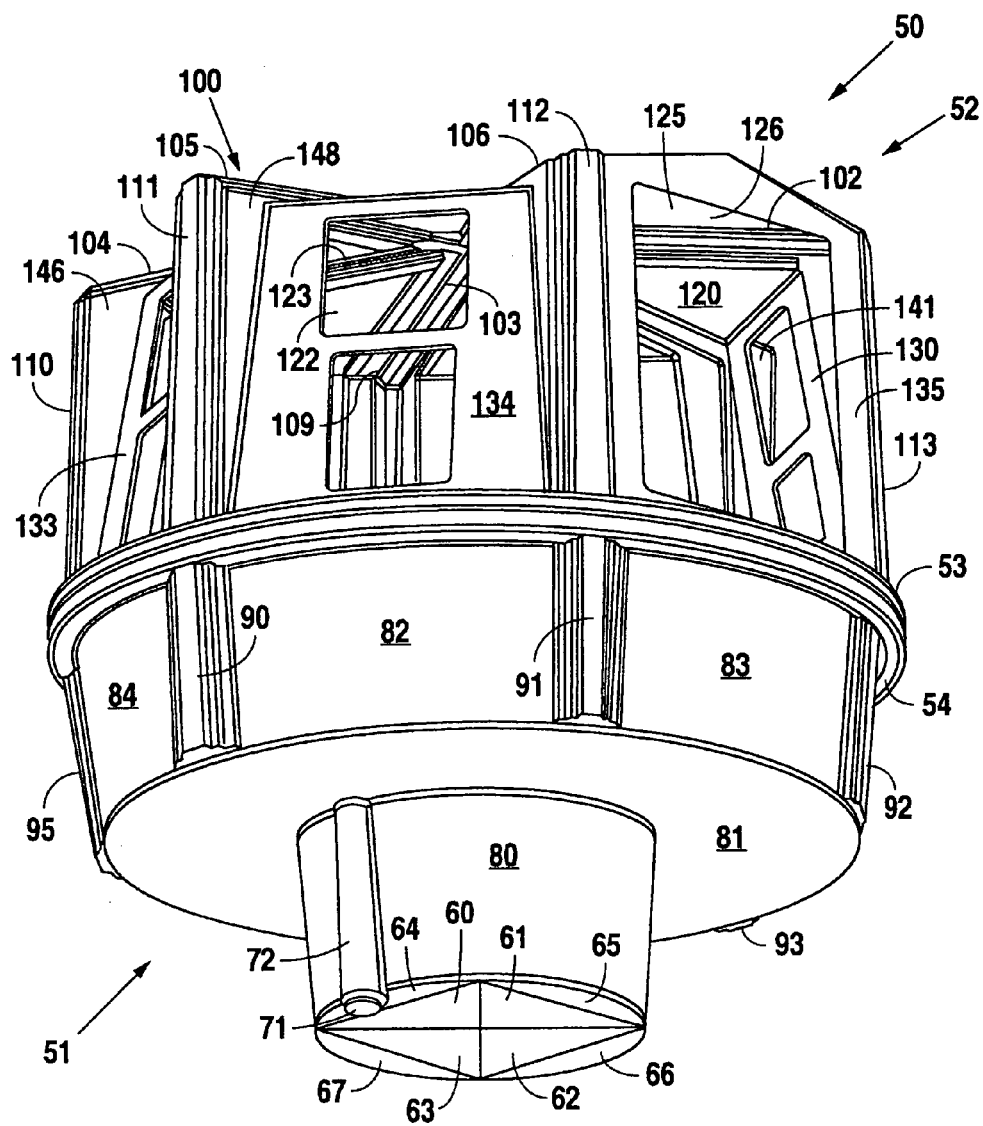
FIG. 19 is a bottom-up perspective view of the outdoor blind of FIG. 18.
Figure 24:
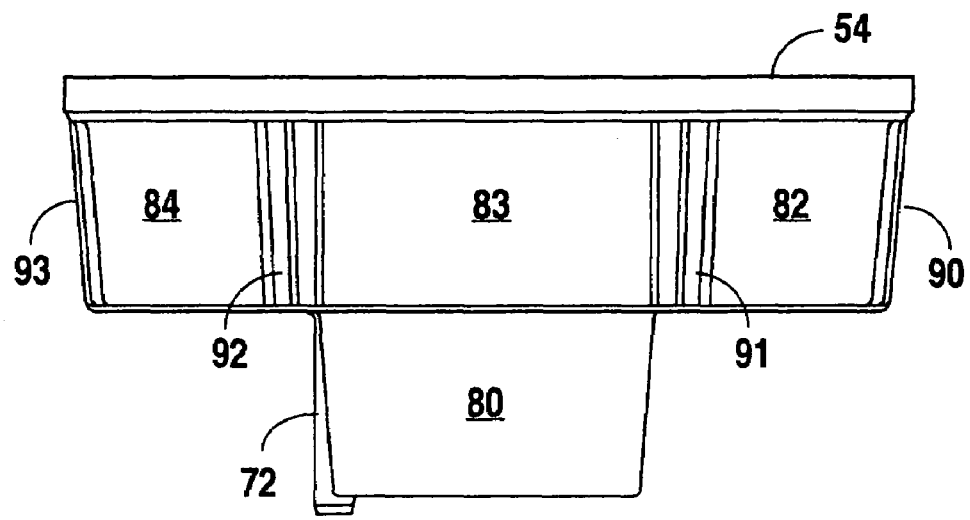
FIG. 24 is a side elevation view of the front side of the bottom section of the outdoor blind of FIG. 18.
Figure 25:
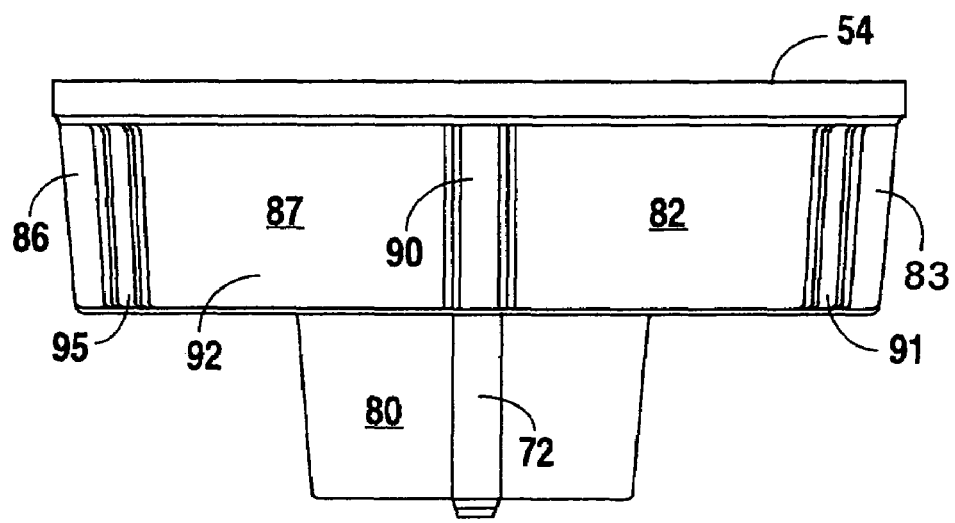
FIG. 25 is a side elevation view of the right side of the bottom section of the outdoor blind of FIG. 18.

FIGS. 18-30 refer to a second embodiment of the upright outdoor blind. Referring to FIG. 18, there is shown a perspective view, from the top-down, of the outdoor blind 50. FIG. 19 shows a perspective view, from the bottom-up, of the second embodiment of the upright outdoor blind 50. The outdoor blind 50 may comprise a lower section 51 and an upper section 52. A generally flat circular peripheral flange 53 attached to the bottom peripheral edge of the upper section 52 of the outdoor blind 50 is designed to sit on the flat circular peripheral flange 54 which is attached to the top peripheral edge of the lower section 51 of the outdoor blind. A waterproof sealant is placed between the mating flanges 53 and 54 when the lower section 51 and upper section 52 are joined together to form a water tight unit. It is understood that the blind 50 could be formed of a single piece depending on the materials and type of construction used.

Referring to FIGS. 20 and 22, the lower section 51 includes panels 60, 61, 62, 63, 64, 65, 66, and 67 that make up the floor surface of the outdoor blind 50. Some of the floor panels 60, 61, 62, and 63 are isosceles triangles with two equal length edges adjoining a longer edge at equal angles. The floor panels 60, 61, 62, and 63 connect to each other along the equal length edges. The remaining floor panels 64, 65, 66, and 67 are half-moon shapes which have a curved edge and a straight edge that is equal in length to the longer edges of floor panels 60, 61, 62, and 63. At the peak of its curved edge, panel 64 has a half circle which defines a notch for the anchor 70. The longer edges of floor panels 60, 61, 62, and 63 are joined to the straight edges of floor panels 64, 65, 66, and 67 such that the curved edges of panels 64, 65, 66, and 67 form a circle.

Referring to FIGS. 20, 22, 24, and 25, the lower section 51 includes an anchor 70. The anchor 70 helps to stabilize the blind after the blind has been buried in the ground. The anchor 70 has a bottom panel 71 that is circular in shape and joins at its edge to the bottom of body 72 which is cylindrical in shape. The anchor 70 has a top panel 73 that joins the top edge of body 72.

Referring to FIGS. 20, 21, 22, 24, and 25, the lower section 51 includes a panel 80 which is shaped like a bucket. Panel 80 has a bottom edge that is joined to the curved edges of floor panels 64, 65, 66, and 67. From its bottom edge, panel 80 extends upward and outward to a top edge that is larger in diameter than the bottom edge. The panel 80 has two edges that run from its bottom edge to its top edge which define a notch in the bucket shaped panel 80. These edges join to the outside of the anchor 70 on body 72. Along its half circle edge, floor panel 64 is joined to the outside of anchor 70 on body 72, defining the notch in panel 64.

Referring to FIGS. 20, 21, 22, 23, 24 and 25, the lower section 51 includes a raised floor panel 81 which is circular in shape with an outer edge and an inner edge. The inner edge of the raised floor panel 81 defines a hole. The raised floor panel 81 has a small half circle, with a radius equal to that of body 72, removed from its inner edge, and this defines the notch for body 72 of the anchor 70. The inner edge of the raised floor panel 81 is joined to the body 72 of anchor 70. The inner edge of the raised floor panel 81 is also joined to the top edge of the bucket shaped panel 80.

Referring to FIGS. 20, 23, 24, and 25, the lower section 51 includes support beams 90, 91, 92, 93, 94, and 95. The lower section support beams 90, 91, 92, 93, 94, and 95 each have a top edge, a bottom edge, and side edges. The top edge and the bottom edge each define two steps shown in detail on FIG. 23. The lower section 51 also includes curved panels 82, 83, 84, 85, 86, and 87. The curved panels 82, 83, 84, 85, 86, and 87 have top and bottom edges that are equal to each other in length, and side edges which are equal to each other in length. The side edges of the curved panels 82, 83, 84, 85, 86, and 87 join to the side edges of the lower section support beams 90, 91, 92, 93, 94, and 95 such that there is an alternating order of curved panels and support beams which form a cylindrical shape. When connected to each other as described above, the bottom edges of the curved panels 82, 83, 84, 85, 86, and 87 and the bottom edges of the lower section support beams 90, 91, 92, 93, 94, and 95 join to the outer edge of the raised floor panel 81. When connected to each other as described above, the top edges of the curved panels 82, 83, 84, 85, 86, and 87 and the top edges of the lower section support beams 90, 91, 92, 93, 94, and 95 join to the flat circular peripheral flange 54.

Referring to FIGS. 18, 19, 26, 27, 28, 29, and 30, the upper section 52 includes a frame 100. The frame 100 includes a center hub 101. The center hub 101 is a circle shape panel that has ridges which step up twice then down twice at its edge. The center hub 101 is joined at its edge to the upper section roof support beams 102, 103, 104, 105, 106, and 107. The upper section roof support beams 102, 103, 104, and 105 each have a hub edge, an outer edge, and side edges. As seen in FIGS. 18 and 23, the hub edge and the outer edge of the upper section roof support beams 102, 103, 104, and 105 each have ridges which step down twice from the middle of the beam to the side edge on both sides of the support beam.

The upper section roof support beam 106 has a hub edge, an outer edge, and side edges. The hub edge and the outer edge of the upper section support beam 106 each have ridges which step down twice from the middle of the beam to the left side edge only, as seen in FIG. 18. The upper section roof support beam 107 has a hub edge, an outer edge, and side edges. The hub edge and the outer edge of the upper section support beam 107 each have ridges which step down twice from the middle of the beam to the right side edge only, as seen in FIG. 18.

Referring to FIG. 18, the upper section roof support beams 102, 103, 104, 105, 106, and 107 are equally spaced from each other. The upper section roof support beams 102, 103, 104, 105, 106, and 107 are joined at their hub edges to the edge of the center hub 101, and they extend outward at a downward angle.

Figure 28:
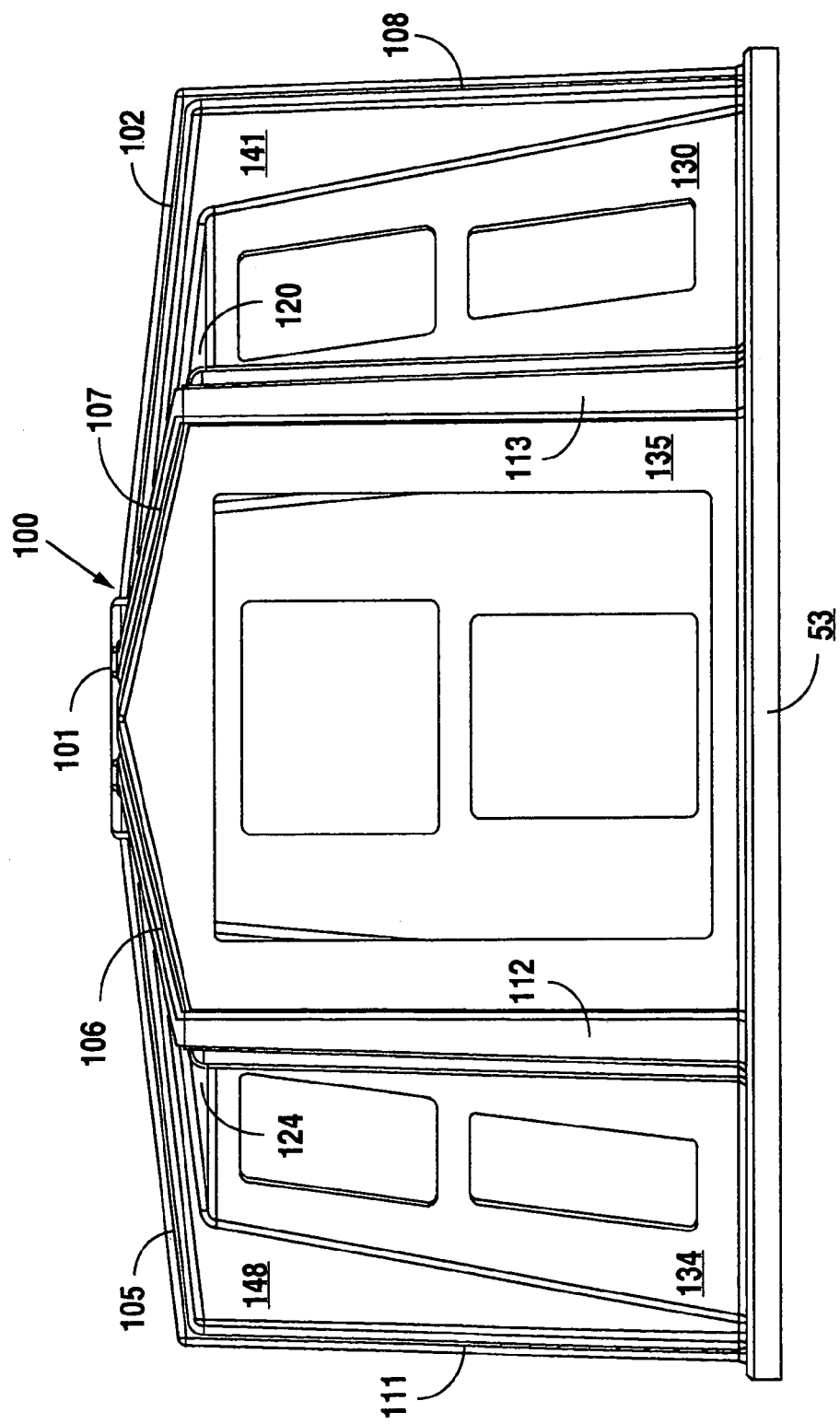
FIG. 28 is a front elevation view of the top section of the outdoor blind of FIG. 18.
Figure 29:
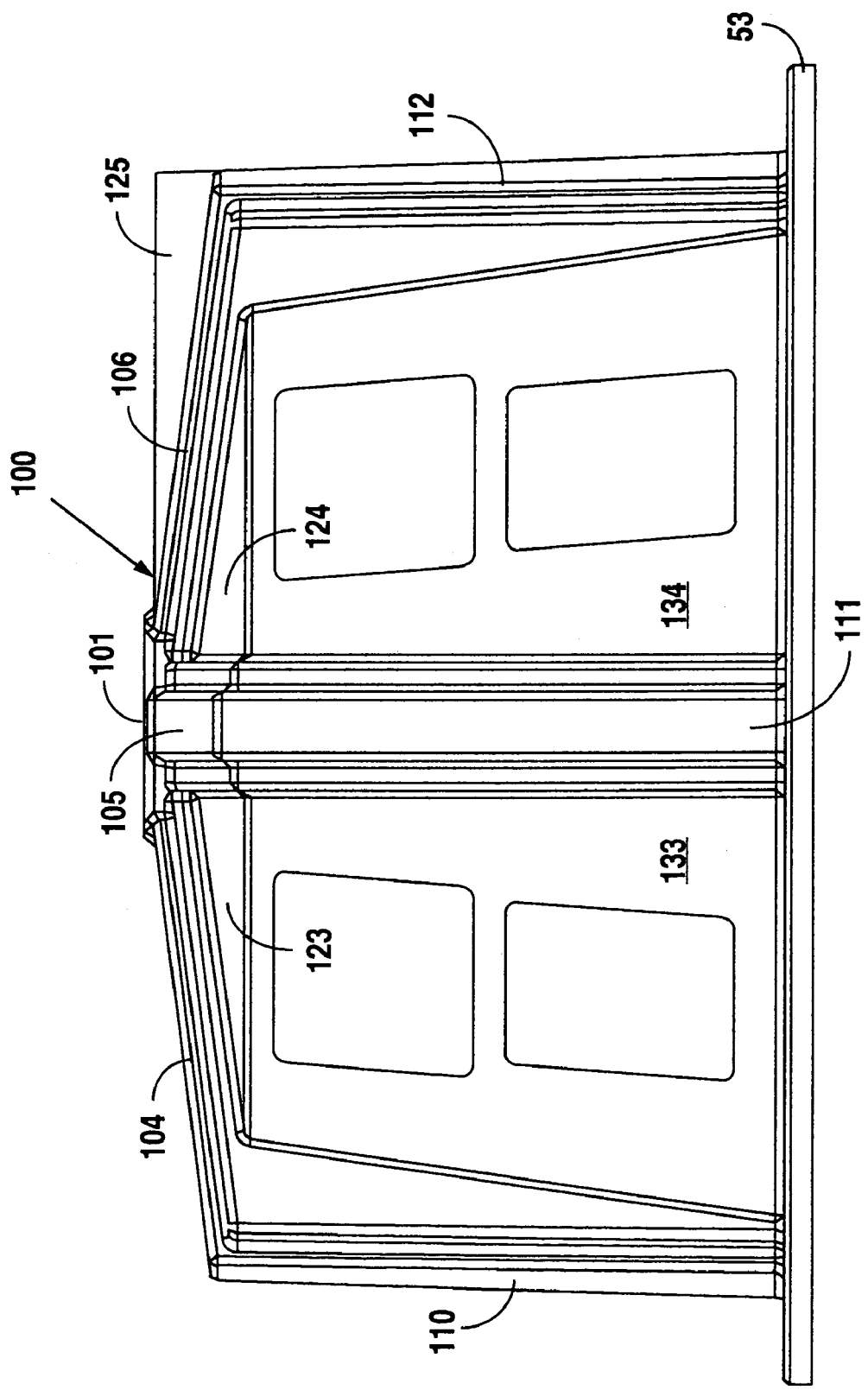
FIG. 29 is a side elevation view of the right side of the top section of the outdoor blind of FIG. 18.

As seen in FIGS. 18 and 28, the frame 100 also includes upper section wall support beams 108, 109, 110, 111, 112, and 113. The upper section wall support beams 108, 109, 110, and 111 each have a top edge, bottom edge, and side edges. As seen in FIGS. 18 and 23, the top edge and the bottom edge of the upper section wall support beams 108, 109, 110, and 111 each have ridges which step down twice from the middle of the beam to the side edge on both sides of the support beam.

The upper section wall support beam 112 has a top edge, a bottom edge, and side edges. The top edge and bottom edge of the upper section wall support beam 112 each have ridges which step down twice from the middle of the beam to the left side edge only, as seen in FIG. 18. The upper section wall support beam 113 has a top edge, a bottom edge, and side edges. The top edge and bottom edge of the upper section wall support beam 113 each have ridges which step down twice from the middle of the beam to the right side edge only, as seen in FIG. 18.

Referring to FIGS. 18, 19, 26, 27, 28, 29, and 30, the upper section wall support beams 108, 109, 110, 111, 112, and 113 are joined at their top edge to the outer edge of the upper section roof support beams 102, 103, 104, 105, 106, and 107 respectively (e.g. 108 to 102, 109 to 103, 110 to 104, 111 to 105, 112 to 106 and 113 to 107).

Referring to FIGS. 18, 26, 28, 29, and 30, the upper section wall support beam 108 is joined at the middle of its bottom edge to the flat circular peripheral flange 53. The left side of the bottom edge of the upper section wall support beam 108 is joined to the upper section flange panel 150. The right side of the bottom edge of the upper section wall support beam 108 is joined to the upper section flange panel 151. The upper section wall support beam 109 is joined at the middle of its bottom edge to the flat circular peripheral flange 53. The left side of the bottom edge of the upper section wall support beam 109 is joined to the upper section flange panel 151. The right side of the bottom edge of the upper section wall support beam 109 is joined to the upper section flange panel 152. The upper section wall support beam 110 is joined at the middle of its bottom edge to the flat circular peripheral flange 53. The left side of the bottom edge of the upper section wall support beam 110 is joined to the upper section flange panel 152. The right side of the bottom edge of the upper section wall support beam 110 is joined to the upper section flange panel 153. The upper section wall support beam 111 is joined at the middle of its bottom edge to the flat circular peripheral flange 53. The left side of the bottom edge of the upper section wall support beam 111 is joined to the upper section flange panel 153. The right side of the bottom edge of the upper section wall support beam 111 is joined to the upper section flange panel 154. The upper section wall support beam 112 is joined at the middle of its bottom edge to the flat circular peripheral flange 53. The left side of the bottom edge of the upper section wall support beam 112 is joined to the upper section flange panel 154. The upper section wall support beam 113 is joined at the middle of its bottom edge to the flat circular peripheral flange 53. The right side of the bottom edge of the upper section wall support beam 113 is joined to the upper section flange panel 150.

Referring to FIGS. 18, 19, 26, 27, 28, and 29, the upper section 52 includes frame edge panels 140, 141, 142, 143, 144, 145, 146, 147, 148, and 149. The frame edge panels 140, 141, 142, 143, 144, 145, 146, 147, 148, and 149 are scalene triangular shapes with a middle length edge that is vertical and extends from the bottom of the panel to the top forming an obtuse angle with a shorter edge, which is at an incline. The shorter edge extends inward, at an incline, to form an acute angle with a longer edge, which is at a decline. The longer edge extends downward, at a decline, to form an acute angle with the middle length edge that is vertical.

As seen in FIGS. 18, 19, 26, 27, 28, and 29, the frame edge panels 141, 143, 145, and 147 are joined at their shorter edge to the left side edge of the upper section wall support beams 102, 103, 104, and 105. The frame edge panels 142, 144, 146, and 148 are joined at their shorter edge to the right side edge of the upper section wall support beams 102, 103, 104, and 105. The frame edge panel 140 is joined at its shorter edge to the right side edge of the upper section wall support beam 107. The frame edge panel 149 is joined at its shorter edge to the left side edge of the upper section wall support beam 106.

As shown in FIGS. 18, 19, 26, 27, 28, and 29, the frame edge panels 141, 143, 145, 147, and 149 are joined at their middle length edge to the left side edge of the upper section wall support beams 108, 109, 110, 111, and 112, respectively. The frame edge panels 140, 142, 144, 146, and 148 are joined at their middle length edge to the right side edge of the upper section wall support beams 113, 108, 109, 110, and 111, respectively.

Referring to FIGS. 18, 19, 26, and 30, the upper section 52 includes roof panels 120, 121, 122, 123, and 124. The roof panels 120, 121, 122, 123, and 124 are in the shape of isosceles triangles with two equal length edges adjoining a shorter edge at equal angles. The equal length sides are joined to the side edges of the upper section roof support beams 102, 103, 104, 105, 106, and 107. The roof panel 120 is joined between the right side edge of roof support beam 107 and the left side edge of roof support beam 102. The roof panel 121 is joined between the right side edge of roof support beam 102 and the left side edge of roof support beam 103. The roof panel 122 is joined between the right side edge of roof support beam 103 and the left side edge of roof support beam 104. The roof panel 123 is joined between the right side edge of roof support beam 104 and the left side edge of roof support beam 105. The roof panel 124 is joined between the right side edge of roof support beam 105 and the left side edge of roof support beam 106.

Figure 26:
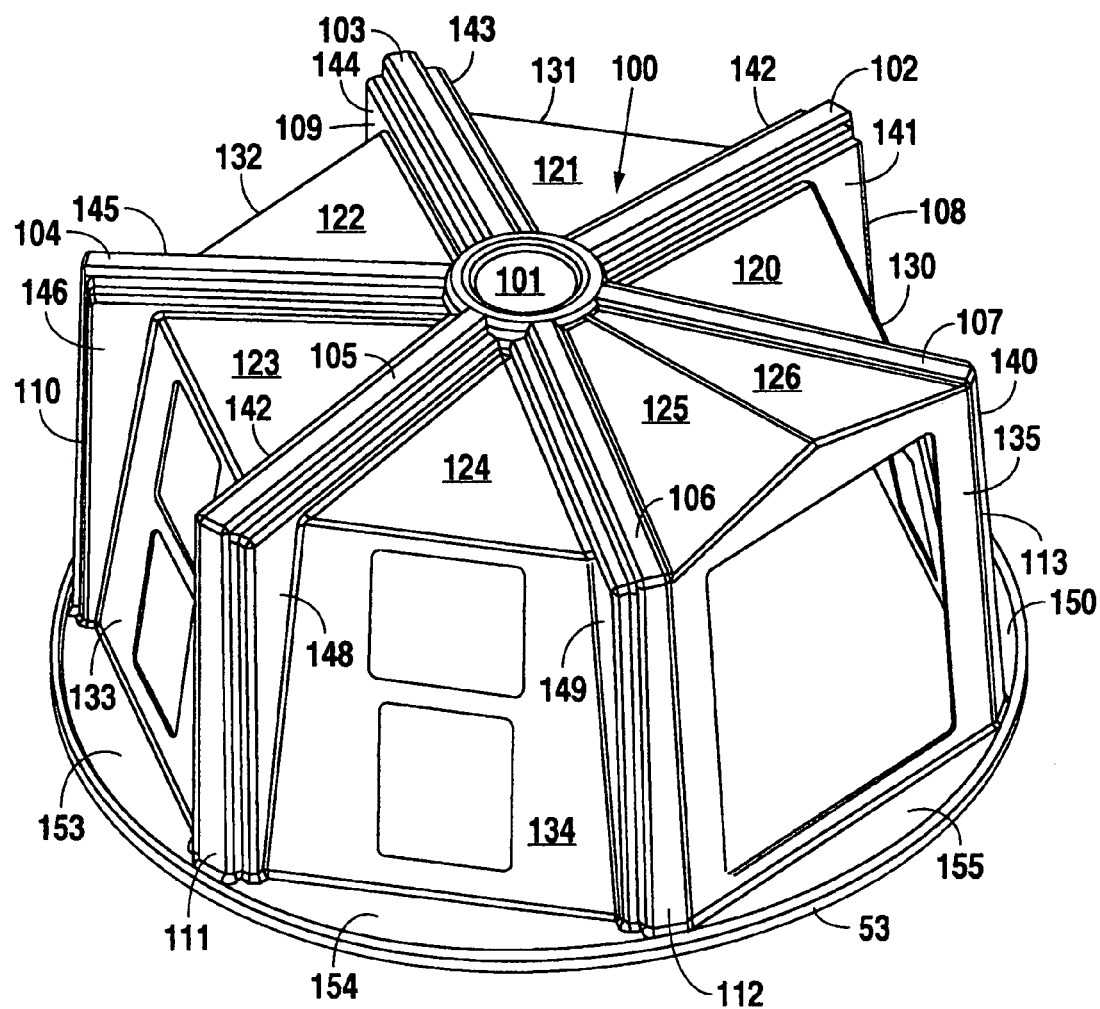
FIG. 26 is a top-down perspective view of the top section of the outdoor blind of FIG. 18.
Figure 27:
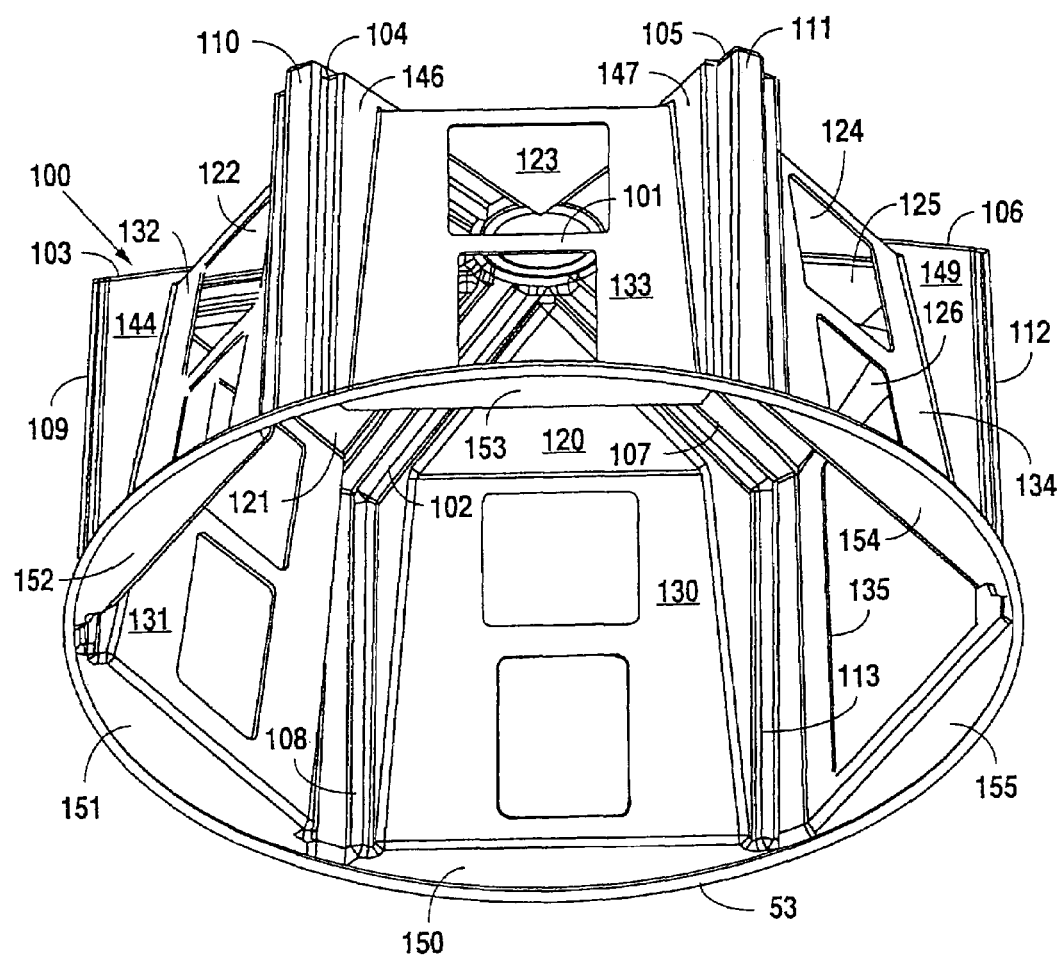
FIG. 27 is a bottom-up perspective view of the top section of the outdoor blind of FIG. 18.

Again referring to FIGS. 18, 19, 26, and 30, the upper section 52 also includes roof panels 125 and 126. The roof panels 125 and 126 are in the shape of right triangles and each have a small curved edge defining a notch at the corner where the hypotenuse edge and the long edge of the right angle would normally converge. The roof panel 125 is joined along its hypotenuse edge to the right side edge of the roof support beam 106. The roof panel 125 is also joined along its curved edge to the edge of the center hub 101, and it is joined along its longer edge to the longer edge of roof panel 126. The roof panel 126 is joined along its hypotenuse to the left side edge of roof support beam 107. The roof panel 126 is also joined along its curved edge to the edge of the center hub 101, and it is joined along its longer edge to the longer edge of roof panel 125. The roof panels 125 and 126 are joined together forming a raised level peak, as seen in FIGS. 18, 26, and 28.

Referring to FIGS. 18, 19, 26, 27, 28, 29, and 30, the upper section 52 includes upper section wall panels 130, 131, 132, 133, and 134. The upper section wall panels 130, 131, 132, 133, and 134 are shaped as trapezoids with two rectangular cut outs defining the viewing windows. The viewing windows consist of a horizontal rectangle in the top half of the upper section wall panels and a vertical rectangle in the bottom half of the upper section wall panels. The external attachments 30 used on the outdoor blind 10, as described above, may also be attached to the viewing windows on the outdoor blind 50. As shown in FIGS. 8, 18, and 28, the inside edges 34*a* and 35*a* of the sidewalls 34 and 35 of the external attachment 30, are inclined at the same angle as the upper section wall panels 130, 131, 132, 133, and 134. The inside edges 32*a,* 33*a,* 34*a,* and 35*a* of the walls 32, 33, 34, and 35 of the external attachment 30, form a flange for mounting. This flange may be used to mount the external attachments 30 to the horizontal and vertical viewing windows on the upper section wall panels 130, 131, 132, 133, and 134 of the outdoor blind 50.

As shown in FIGS. 18, 19, 26, 27, 28, 29, and 30, the top edge of the upper section wall panel 130 is joined to the shorter edge of the roof panel 120. From its top edge, the upper section wall panel 130 extends outward and downward at an angle. The bottom edge of the upper section wall panel 130 is joined to the flange panel 150. The left edge of the upper section wall panel 130 is joined to the longer edge of frame edge panel 140. The right edge of the upper section wall panel 130 is joined to the longer edge of frame edge panel 141. The top edge of the upper section wall panel 131 is joined to the shorter edge of the roof panel 121. From its top edge, the upper section wall panel 131 extends outward and downward at an angle. The bottom edge of the upper section wall panel 131 is joined to the flange panel 151. The left edge of the upper section wall panel 131 is joined to the longer edge of frame edge panel 142. The right edge of the upper section wall panel 131 is joined to the longer edge of frame edge panel 143. The top edge of the upper section wall panel 132 is joined to the shorter edge of the roof panel 122. From its top edge, the upper section wall panel 132 extends outward and downward at an angle. The bottom edge of the upper section wall panel 132 is joined to the flange panel 152. The left edge of the upper section wall panel 132 is joined to the longer edge of frame edge panel 144. The right edge of the upper section wall panel 132 is joined to the longer edge of frame edge panel 145. The top edge of the upper section wall panel 133 is joined to the shorter edge of the roof panel 123. From its top edge, the upper section wall panel 133 extends outward and downward at an angle. The bottom edge of the upper section wall panel 133 is joined to the flange panel 153. The left edge of the upper section wall panel 133 is joined to the longer edge of frame edge panel 146. The right edge of the upper section wall panel 133 is joined to the longer edge of frame edge panel 147. The top edge of the upper section wall panel 134 is joined to the shorter edge of the roof panel 124. From its top edge, the upper section wall panel 134 extends outward and downward at an angle. The bottom edge of the upper section wall panel 134 is joined to the flange panel 154. The left edge of the upper section wall panel 134 is joined to the longer edge of frame edge panel 148. The right edge of the upper section wall panel 134 is joined to the longer edge of frame edge panel 149.

Referring to FIGS. 18, 19, 26, 27, and 28, the upper section wall panel 135 consists of three equal length edges and two shorter equal length top edges which form a peak. The left side edge of the upper section wall panel 135 is joined to the right side edge of upper section wall support beam 112. The right side edge of the upper section wall panel 135 is joined to left side edge of upper section wall support beam 113. The top edges of the upper section wall panel 135 are joined to the shorter edges of roof panels 125 and 126. The bottom edge of the upper section wall panel 135 is joined to the flange panel 155.

Figure 30:
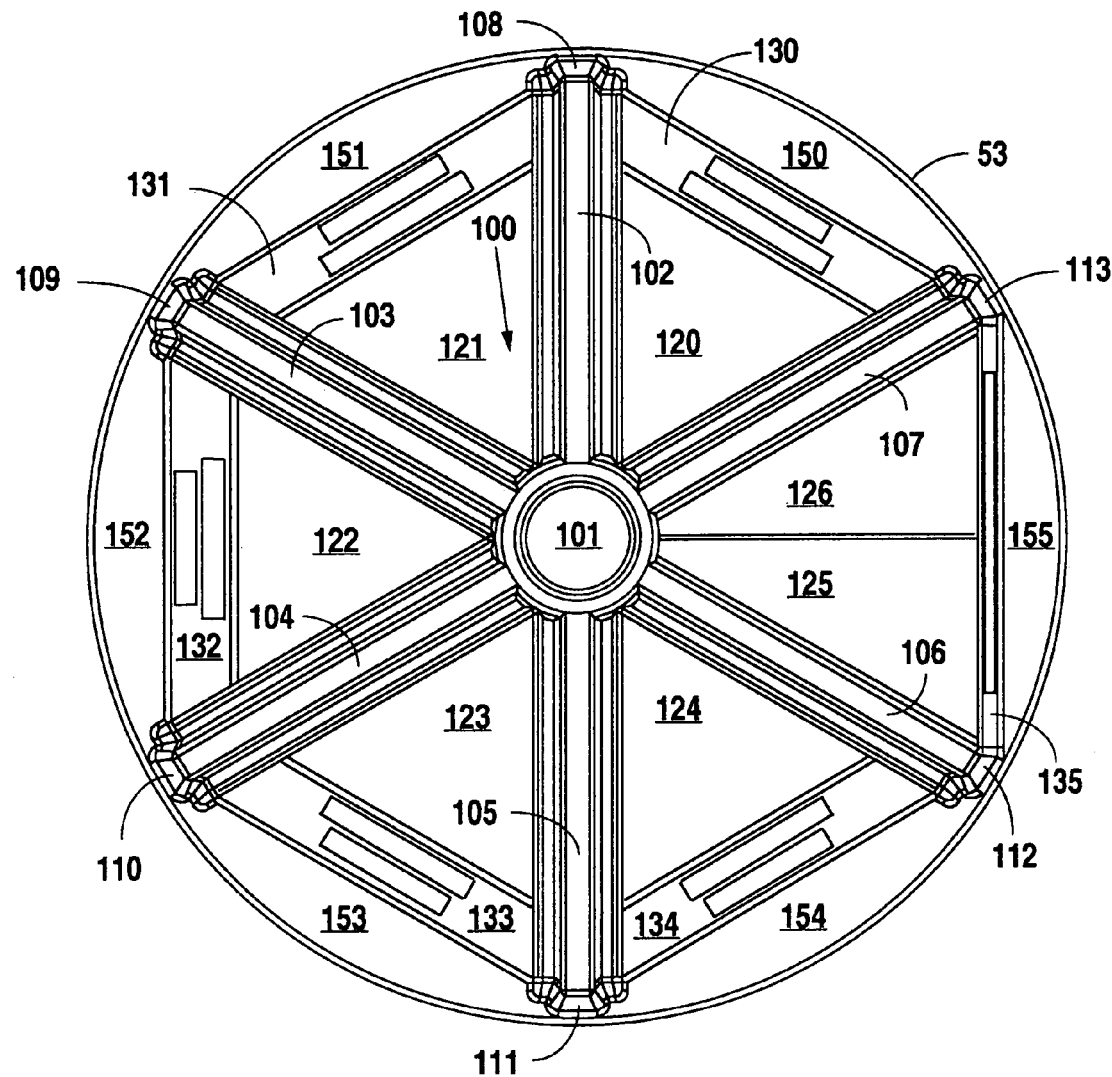
FIG. 30 is a top plain view of the top section of the outdoor blind of FIG. 18.

Referring to FIGS. 18, 26, 27, and 30, the upper section 52 includes upper section flange panels 150, 151, 152, 153, and 154. The upper section flange panels 150, 151, 152, and 153 are half moon shapes with a curved edge and a straight edge. At both the right side end and the left side end of the upper section flange panels 150, 151, 152, and 153 is a notch defined by two small steps, as illustrated in FIG. 30.

As illustrated in FIGS. 18, 26, 27, and 30, the flange panel 150 is joined at its curved edge to the flat circular peripheral flange 53. The straight edge of flange panel 150 is joined to the bottom edge of upper section wall panel 130. The left notched edge of flange panel 150 is joined to the right side edge of the upper section wall support beam 113, and the right notched edge is joined to the left side edge of the upper section wall support beam 108. The flange panel 151 is joined at its curved edge to the flat circular peripheral flange 53. The straight edge of flange panel 151 is joined to the bottom edge of upper section wall panel 131. The left notched edge of flange panel 151 is joined to the right side edge of the upper section wall support beam 108, and the right notched edge is joined to the left side edge of the upper section wall support beam 109. The flange panel 152 is joined at its curved edge to the flat circular peripheral flange 53. The straight edge of flange panel 152 is joined to the bottom edge of upper section wall panel 132. The left notched edge of flange panel 152 is joined to the right side edge of the upper section wall support beam 109, and the right notched edge is joined to the left side edge of the upper section wall support beam 110. The flange panel 153 is joined at its curved edge to the flat circular peripheral flange 53. The straight edge of flange panel 153 is joined to the bottom edge of upper section wall panel 133. The left notched edge of flange panel 153 is joined to the right side edge of the upper section wall support beam 110, and the right notched edge is joined to the left side edge of the upper section wall support beam 111. The flange panel 154 is joined at its curved edge to the flat circular peripheral flange 53. The straight edge of flange panel 154 is joined to the bottom edge of upper section wall panel 134. The left notched edge of flange panel 154 is joined to the right side edge of the upper section wall support beam 111, and the right notched edge is joined to the left side edge of the upper section wall support beam 112.

As seen in FIGS. 18 and 30, the upper section flange panel 155 is a half moon shape with a curved edge and a straight edge. The upper section flange panel 155 is joined at its curved edge to the flat circular peripheral flange 53, and it is joined at its straight edge to the bottom edge of upper section wall panel 135.

The lower portion 51 of the outdoor blind 50 is designed to be installed underground such that the lower portion 51 is generally level with the surface of the ground. When properly positioned in the ground the viewing windows are just above ground level. This positions the hunter at a very low level relative to the game. Positioning the viewing windows near ground level facilitates the lack of detection by any wildlife that may be near by. This is true because it is generally possible for game such as deer to look over the top of the blind, rather than into the blind, which allows a hunter to remain undiscovered. Burying the lower section 51 of the blind underground also reduces human scent and noises. This puts the user on a similar level with most animals.

The interior of the outdoor blind 50 is generally spacious and this allows room for more than one user to simultaneously view the windows positioned on the sides of the blind. The purpose for having multiple viewing windows on the upper section wall panels is to allow a user to have access to one viewing window for viewing, photographing, video taping, etc., without blocking the view of a hunter who is using another viewing window. In order to provide convenient viewing for the user while he/she is sitting in a standard chair located inside the blind, all vertical viewing windows are set at a height that is equivalent to the eye level of an average sized person who is sitting in a standard chair while inside the blind. Standing room is also provided for more than one average sized individual.

The basic shell of the outdoor blind 50 may be constructed of fiberglass. However, other material may be used, but the material should be waterproof and rot resistant, preferably.

Figure 31:
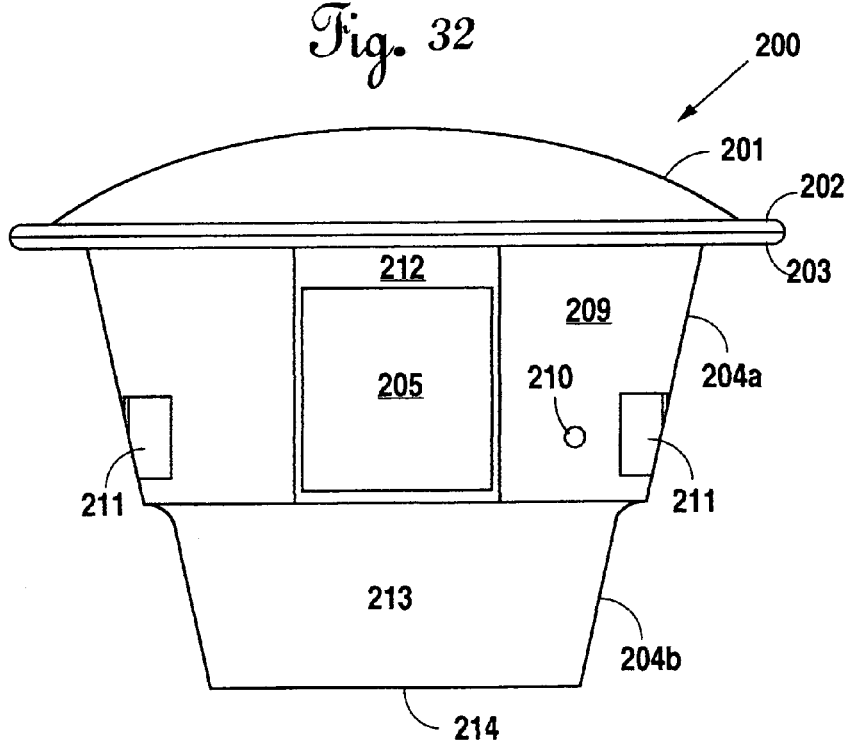
FIG. 31 is a front elevation view of a third embodiment of the outdoor blind.

FIGS. 31-36 refer to a third embodiment of the upright outdoor blind. FIG. 31 shows a front elevation view of the outdoor blind 200. The outdoor blind 200 comprises a dome roof section 201 and a base section 204. The base section 204 comprises a middle section 204a, and a lower section 204b. The middle section 204a and the lower section 204b are constructed as a single unit.

Figure 32:
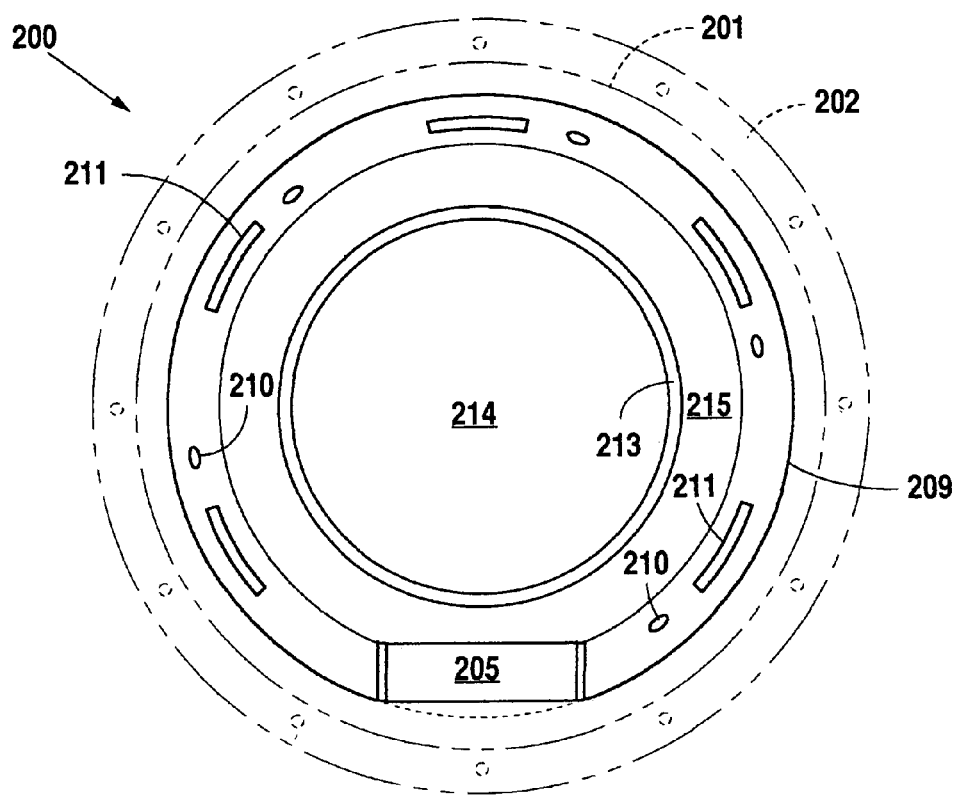
FIG. 32 is a top perspective view of the outdoor blind on FIG. 31.

As seen from FIGS. 31 and 32, the outdoor blind 200 has a dome roof 201. The dome roof 201 is joined at its edge to the upper section flat flange 202. The bottom peripheral edge of the upper section flat flange 202 is designed to sit on the top peripheral edge of the lower section flat flange 203. The upper section flat flange 202 and the lower section flat flange 203 have multiple screw holes 208 which are superimposed on one another and spaced at equal distances from each other, as illustrated in FIG. 32. A waterproof sealant is placed between the bottom peripheral edge of the upper section flat flange 202 and the top peripheral edge of the lower section flat flange 203 such that when the two sections are joined together they form a single water tight unit. Bolts are inserted into the screw holes 208, and nuts are screwed on to those bolts in order to fasten the roof section 201 to the base section 204. It is understood that the outdoor blind 200 could be built as a single unit, rather than two sections, depending on the materials and type of construction used.

Referring to FIGS. 31 and 32, the middle section 204a comprises a lower section flat flange 203, a curved middle wall panel 209, multiple viewing holes 210, multiple viewing windows 211, a door panel 212, and an entry door 205. As seen from FIG. 31, the curved middle wall panel 209 is joined at its top edge to the lower section flat flange 203. From its top edge, the curved middle wall panel 209 extends downward and inward at an angle. As illustrated in FIG. 32, the curved middle wall panel 209 is nearly circular. The curved middle wall panel 209 is joined at its side edges to the flat door panel 212, as seen in FIGS. 31 and 32. The curved middle wall panel 209 includes several viewing holes 210 and several viewing windows 211. The viewing holes 210 may be used to view, photograph, videotape, etc., while the viewing windows 211 provide openings for viewing and for extending an arrow, gun barrel, or camera through said openings. The viewing holes 210 are spaced at an equal distance apart from one another, and the viewing windows 211 are also spaced at equal distance apart from one another.

The external attachments 30 used on the outdoor blind 10, as described above, may also be attached to the viewing windows on the outdoor blind 200. As shown in FIG. 8, the inside edges 32a, 33a, 34a, and 35a of the walls 32, 33, 34, and 35 of the external attachment 30, form a flange for mounting. This flange may be used to mount the external attachments 30 to the viewing windows on the curved middle wall panel 209 of the outdoor blind 200.

Making reference to FIGS. 31, 32, and 33, the door panel 212 is joined at its outside top edge to the lower section flat flange 203. Both outside side edges of the door panel 212 are joined to the side edges of the curved middle wall panel 209. The outside bottom edge of the door panel 212 is joined to the top surface of the raised floor panel 215, as seen in FIG. 31.

Figure 35:
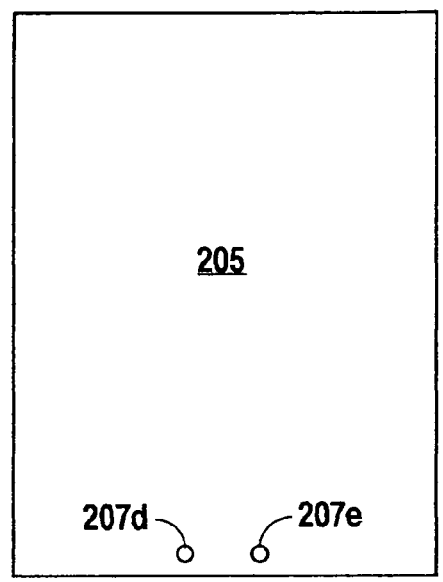
FIG. 35 is an external front elevation view of the entry door for the outdoor blind of FIG. 31.

The middle section 204a also includes an entry door 205, as seen in FIGS. 31, 32, 34, 35, and 36. The entry door 205 has hinges 206a and 206b on its top edge, and with these hinges the entry door 205 is mounted to the top inside edge of the door panel 212. As shown in FIGS. 31, 34, and 36, the entry door 205 can swing open and closed, and it includes molded-in inserts 207a, 207b, and 207c on its internal surface, which allow conventional latches to be used to secure the entry door 205 in place. On its outside surface, the entry door 205 has molded-in inserts 207d and 207e used for attaching a handle to the outside of the entry door 205, as seen in FIG. 35.

Referring to FIGS. 31 and 32, the lower section 204b comprises a curved lower wall panel 213, a floor panel 214, and a raised floor panel 215. As seen in FIG. 32, the raised floor panel 215 is circular in shape with an outer edge and an inner edge. The outer edge of the raised floor panel 215 is joined to the bottom edge of the curved middle wall panel 209. The inner edge of the raised floor panel 215 defines a hole, and it is joined to the top edge of the curved lower wall panel 213.

Again referring to FIGS. 31 and 32, the curved lower wall panel 213 is circular in shape. The top edge of the curved lower wall panel 213 is joined to the inner edge of the raised floor panel 215. From its top edge, the curved lower wall panel 213 extends downward and inward at an angle. The bottom edge of the curved lower wall panel 213 is joined to the edge of the floor panel 214. The floor panel 214 is circular in shape, as seen in FIG. 32.

The lower section 204b of the outdoor blind 200 is designed to be installed underground such that the lower section 204b is generally level with the surface of the ground. When properly positioned in the ground the viewing windows are just above ground level. This positions the hunter at a very low level relative to the game. Positioning the viewing windows near ground level facilitates the lack of detection by any wildlife that may be near by. This is true because it is generally possible for game such as deer to look over the top of the blind, rather than into the blind, which allows a hunter to remain undiscovered. Burying the lower section 204b of the blind underground also reduces human scent and noises. This puts the user on a similar level with most animals.

The interior of the outdoor blind 200 is generally spacious and this allows room for more than one user to simultaneously view any of the viewing windows positioned around the blind. The purpose for having multiple viewing holes 210 and viewing windows 211 around the upper section wall panel 209 is to allow a user to have access to a viewing hole for viewing, photographing, video taping, etc., without blocking the view of a hunter who is using a viewing window. In order to provide convenient viewing for the user while he/she is sitting in a standard chair located inside the blind, all viewing windows are set at a height that is equivalent to the eye level of an average sized person who is sitting in a standard chair while inside the blind. Standing room is also provided for more than one averaged sized individual.

The basic shell of the outdoor blind 200 may be constructed of fiberglass. However, other material may be used, but the material should be waterproof and rot resistant, preferably.

Figure 37:
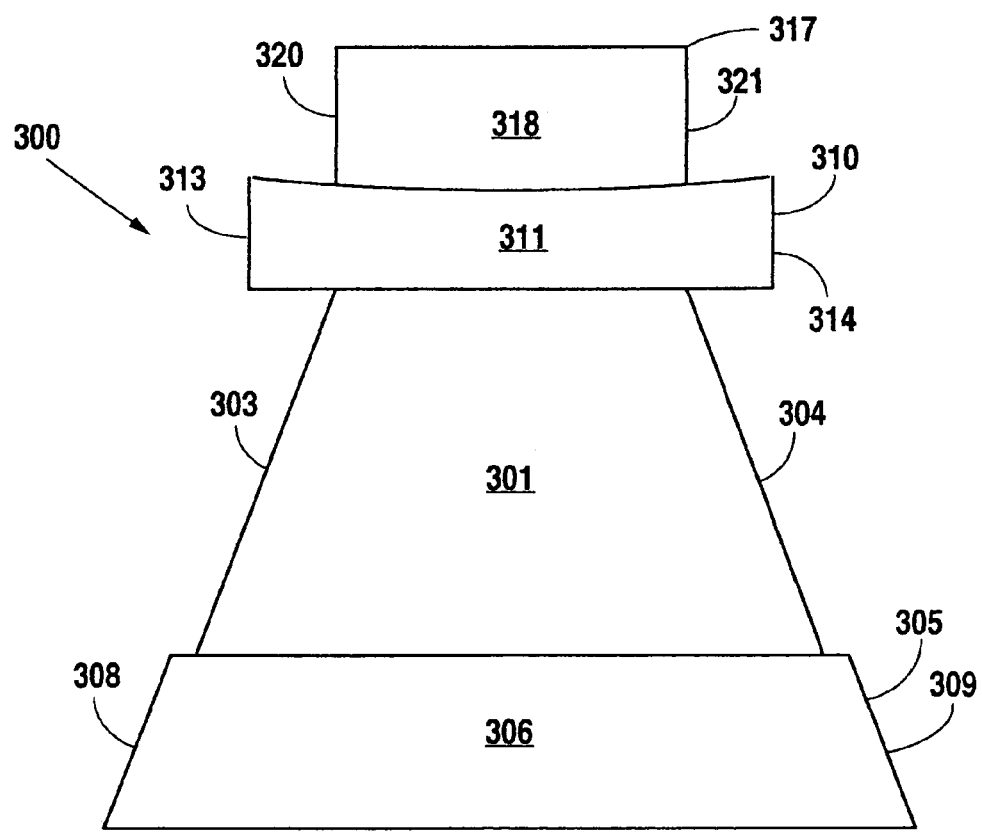
FIG. 37 is a top plain view of a second embodiment of the external attachment for the viewing windows on the outdoor blinds of FIGS. 1, 18, and 31.
Figure 38:
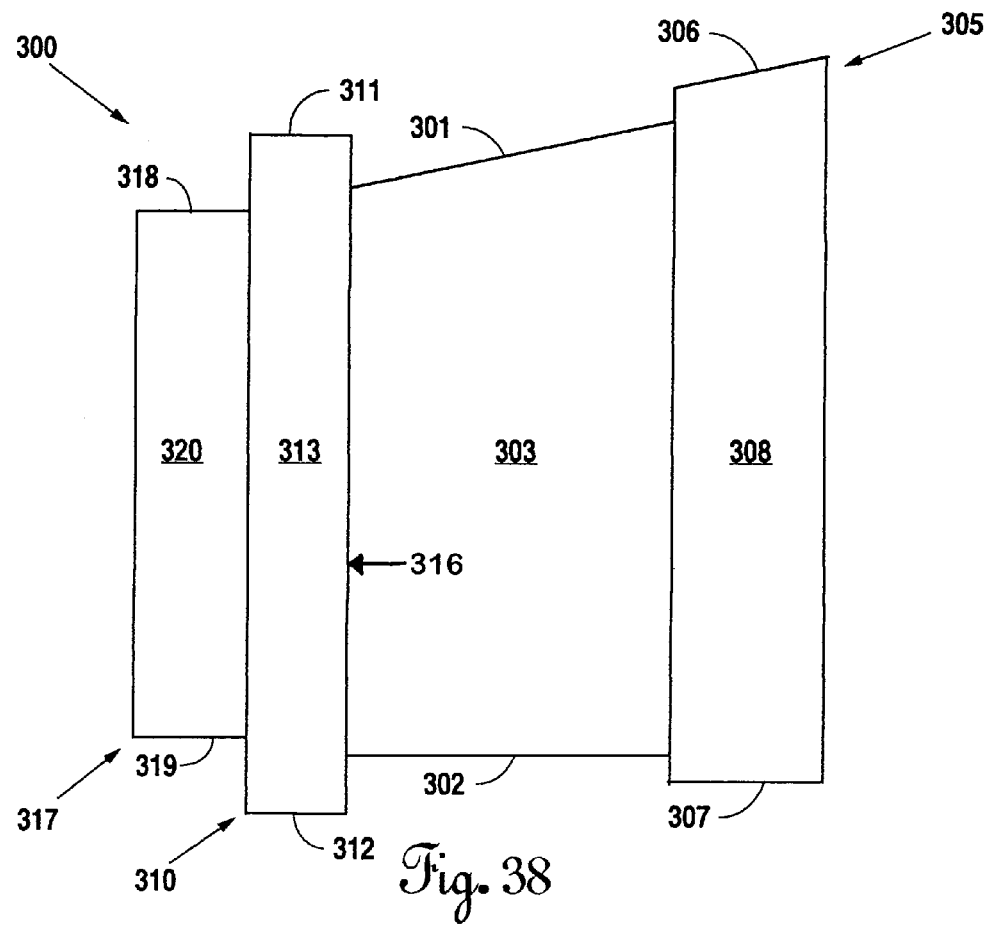
FIG. 38 is a side elevation view of the external attachment of FIG. 37.
Figure 39:
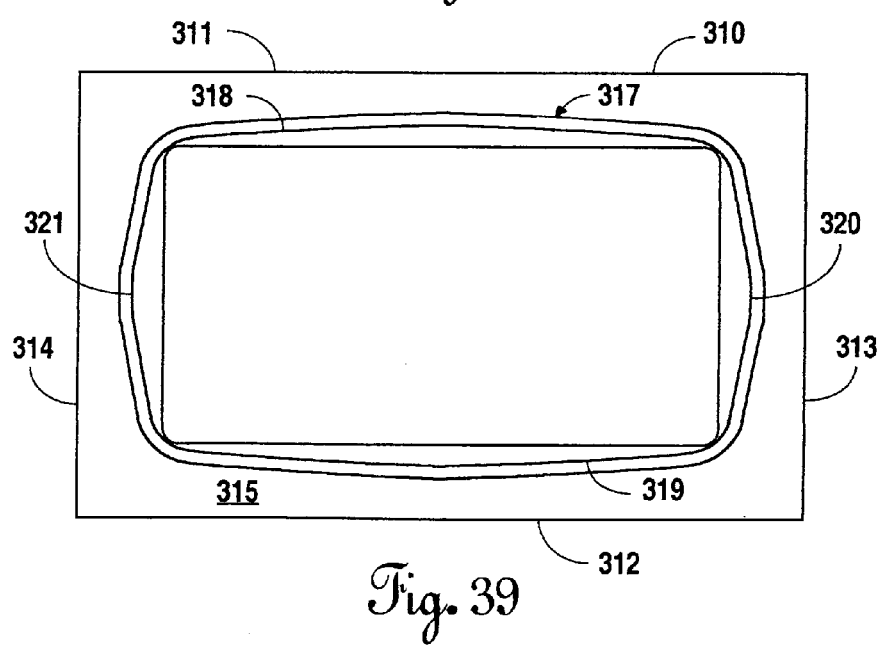
FIG. 39 is an internal front plain view of the external attachment of FIG. 37.

FIGS. 37-39 illustrate a second embodiment of the external attachment for the viewing windows on the outdoor blinds 10, 50, and 200. The external blind attachment 300 extends externally from the blind in order to prevent an animal from viewing a gun barrel, an arrow, or a camera that is positioned outside of the blind walls.

Referring to FIGS. 37 and 38, the external attachment 300 includes a top wall 301, a bottom wall 302, and sidewalls 303 and 304. As seen in FIGS. 37 and 38, the sidewalls 303 and 304 flare outward while the top wall 301 flares upward, but the bottom wall 302 does not flare in any direction. This increases the cross sectional area of the external attachment 300 as the distance from the blind increases. The outer edges of walls 301, 302, 303, and 304 are joined to the inner edges of the external attachment hood 305. The external attachment hood 305 comprises a top wall 306, a bottom wall 307, and sidewalls 308 and 309. As seen in FIGS. 37 and 38, the sidewalls 308 and 309 flare outward while the top wall 306 flares upward, but the bottom wall 307 does not flare in any direction. This increases the cross sectional area of the external attachment hood 305. The increase in cross sectional areas of both the external attachment 300 and the external attachment hood 305 allows peripheral vision for the hunter or observer in the blind.

Referring to FIGS. 37, 38, and 39, the external attachment 300 has a mounting flange 310 which includes a top wall 311, a bottom wall 312, sidewalls 313 and 314, an inner wall 315, and an outer wall 316. The mounting flange 310 is rectangular in shape, and it has a rectangular void through its center to provide for viewing through the external attachment 300, as seen in FIG. 39. As illustrated by FIG. 37, the mounting flange inner wall 315 is arched and not flat. The mounting flange 310 may be used to mount the external attachment 300 to the viewing windows of outdoor blinds 10, 50, or 200.

Again referring to FIGS. 37, 38, and 39, the inner edges of walls 301, 302, 303, and 304 are joined to the inside edges of the mounting flange outer wall 316. The inside edges of the mounting flange inner wall 315, are joined to the edges of the internal viewing collar 317. The internal viewing collar 317 has a top wall 318, a bottom wall 319, and sidewalls 320 and 321. The top wall 318 and the bottom walls 319 are slightly arched, while the sidewalls 320 and 321 have a greater arch.

The external attachment 300 may be constructed of fiberglass. However, other material may be used, but the material should be waterproof and rot resistant, preferably.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the specification and following claims.

The invention claimed is:

1. An outdoor blind comprising:
    an upright outdoor blind means having upper and lower sections with the lower section constructed such that it can be positioned underground;
    multiple viewing means mounted on the walls of the upright blind such that the viewing means are adjacent to the ground level when the lower section is positioned underground and which provide an opening for viewing and extending an arrow, a gun barrel, or a camera through said opening;
    wherein said viewing means have extensions extending inwardly from openings in the walls of the blind to conceal the arrow, gun barrel, or camera, and the person extending said arrow, gun barrel, or camera through said opening;
    the upright outdoor blind means having a height sufficient for more than one average hunter to stand upright in the blind and a width sufficient for more than one average hunter to sit comfortably in the blind and move between the viewing means.

2. The outdoor blind of claim 1 wherein said upright blind is formed of upper and lower section means that form the upright blind.

3. The outdoor blind of claim 1 wherein said blind includes a vent means to provide ventilation.

4. The outdoor blind means of claim 1 wherein said blind includes a door means to allow ingress and egress and to prevent detection of anyone in the blind.

5. The outdoor blind of claim 1 wherein said viewing means have extensions extending outwardly from openings in the walls of the blind to further conceal the arrow, gun barrel, or camera, and the person extending said arrow, gun barrel, or camera through said opening.

6. The outdoor blind of claim 1 wherein said viewing means have extensions that extend outwardly and have a cross section that increases away from the openings in the walls of the blind to further conceal the arrow, gun barrel, or camera, and the person extending said arrow, gun barrel, or camera through said opening and provide peripheral viewing for that person.

7. An outdoor blind comprising:
an upright outdoor blind means having upper and lower sections with the lower section constructed such that it can be positioned underground;
multiple viewing means mounted on the walls of the upright blind such that the viewing means are adjacent to the ground level when the lower section is positioned underground and which provide an opening for viewing and extending an arrow, a gun barrel, or a camera through said opening;
wherein said viewing means have extensions that extend outwardly and have a cross section that increases away from the openings in the walls of the blind to conceal the arrow, gun barrel, or camera, and the person extending said arrow, gun barrel, or camera through said opening and provide peripheral viewing for that person;
the upright outdoor blind means having a height sufficient for more than one average hunter to stand upright in the blind and a width sufficient for more than one average hunter to sit comfortably in the blind and move between the viewing means.

8. The outdoor blind of claim 7 wherein said upright blind is formed of upper and lower section means that form the upright blind.

9. The outdoor blind of claim 7 wherein said lower section has an anchor to secure the blind to the ground.

10. The outdoor blind of claim 7 wherein said blind includes a door means to allow ingress and egress and to prevent detection of anyone in the blind.

11. An outdoor blind comprising:
an upright outdoor blind means having upper and lower sections with the lower section constructed such that it can be positioned underground;
multiple viewing means mounted on the walls of the upright blind such that the viewing means are adjacent to the ground level when the lower section is positioned underground and which provide an opening for viewing and extending an arrow, a gun barrel, or a camera through said opening;
wherein said viewing means have extensions that extend outwardly and inwardly and have a cross section that increases away from the openings in the walls of the blind to conceal the arrow, gun barrel, or camera, and the person extending said arrow, gun barrel, or camera through said opening and provide peripheral viewing;
the upright outdoor blind means having a height sufficient for more than one average hunter to stand upright in the blind and a width sufficient for more than one average hunter to sit comfortably in the blind and move between the viewing means.

12. The outdoor blind of claim 11 wherein said upright blind is formed of upper and lower section means that form the upright blind.

* * * * *